United States Patent
Andrade-Cetto et al.

(10) Patent No.: US 10,956,212 B1
(45) Date of Patent: Mar. 23, 2021

(54) SCHEDULER FOR TALL-GATHERING ALGORITHMS THAT INCLUDE CONTROL FLOW STATEMENTS

(71) Applicant: The MathWorks, Inc., Natick, MA (US)

(72) Inventors: Lucio Andrade-Cetto, Natick, MA (US); Thomas Lane, Carlisle, MA (US); Richard Amos, St. Ives (GB)

(73) Assignee: The MathWorks, Inc., Natick, MA (US)

( * ) Notice: Subject to any disclaimer, the term of this patent is extended or adjusted under 35 U.S.C. 154(b) by 83 days.

(21) Appl. No.: 16/296,901

(22) Filed: Mar. 8, 2019

(51) Int. Cl.
*G06F 9/44* (2018.01)
*G06F 9/48* (2006.01)
*G06F 16/22* (2019.01)
*G06F 9/448* (2018.01)
*G06F 9/38* (2018.01)

(52) U.S. Cl.
CPC .......... *G06F 9/4881* (2013.01); *G06F 9/3838* (2013.01); *G06F 9/4484* (2018.02); *G06F 16/2272* (2019.01); *G06F 16/2282* (2019.01)

(58) Field of Classification Search
CPC ............... G06F 9/4881; G06F 16/2272; G06F 16/2282; G06F 9/3838
See application file for complete search history.

(56) References Cited

U.S. PATENT DOCUMENTS

| | | | | |
|---|---|---|---|---|
| 6,212,617 | B1* | 4/2001 | Hardwick | G06F 8/457 345/505 |
| 2006/0059473 | A1* | 3/2006 | Moler | G06F 8/45 717/149 |
| 2009/0307669 | A1* | 12/2009 | Garst, Jr. | G06F 11/362 717/130 |
| 2010/0131955 | A1* | 5/2010 | Brent | G06F 9/4843 718/103 |
| 2014/0032527 | A1* | 1/2014 | Chambers | G06F 8/34 707/717 |

(Continued)

OTHER PUBLICATIONS

Cheung et al., "Sloth: Being Lazy is a Virtue (When Issuing Database Queries)," ACM Trans. Database System, 41, 2 Article 8 (Jun. 2016) 42 pages, http://dx.doi.org/10.1145/2894749.

(Continued)

*Primary Examiner* — Hang Pan
(74) *Attorney, Agent, or Firm* — Wolf, Greenfield & Sacks, P.C.

(57) ABSTRACT

A scheduler is provided for tall algorithms that include control flow statements that are dependent on tall computations. Thunks may be defined for the tall algorithms and the boundaries or limits of the thunks may be determined by places where tall variables are required to be gathered. The scheduler executes the tall algorithms by calling individually the thunks from the tall algorithms and pausing when a gather operation is required. The scheduler collectively gathers the tall variables from different tall algorithms by using an optimizer to combine I/O operations for the tall algorithms. The scheduler may put back the gathered variables into the context of each tall algorithm, and the scheduler may resume with the next thunk for each tall algorithm. This process may be repeated until all tall algorithms are finished.

18 Claims, 20 Drawing Sheets

(56) References Cited

U.S. PATENT DOCUMENTS

| | | | |
|---|---|---|---|
| 2014/0282574 A1* | 9/2014 | Marathe | G06F 9/4881 |
| | | | 718/103 |
| 2015/0373105 A1 | 12/2015 | Okada et al. | |
| 2016/0321310 A1 | 11/2016 | Alshammari | |

OTHER PUBLICATIONS

Co-pending U.S. Appl. No. 15/216,493, entitled "Big Data Read-Write Reduction", by Martin et al., filed Jul. 21, 2016, 77 pages.

[No Author Listed] Apache Spark. Wikipedia. https://en.wikipedia.org/wiki/Apache_Spark, last accessed on Jul. 21, 2016, 5 pages.

\* cited by examiner

```
TECHNICAL COMPUTING ENVIRONMENT (TCE) 220
File   Edit   Tools   View   Execute tf_tall = foo_A(X_tall);

if tf_tall
    result_tall = foo_B(X_tall);
else
    result_tall = foo_C(X_tall);
end
```

TECHNICAL COMPUTING ENVIRONMENT (TCE) 220

File  Edit  Tools  View  Execute

```
function thunk_1()
    tf_tall = foo_A(X_tall);
end function thunk_2()
    if tf_tall
        result_tall = foo_B(X_tall);
    else
        result_tall = foo_C(X_tall);
    end
end
```

TECHNICAL COMPUTING ENVIRONMENT (TCE) 220

File  Edit  Tools  View  Execute

```
function varargout = foo(X,...,iJob,varargin)

% Prelude code
    ...
    % Initialization of nested variables
    ...
    addNestedJob(iJob,@thunk_1,@pushVar)

function iNext = thunk_1()
        ...
    end function iNext = thunk_2()
        ...
    end function iOut = thunk_last()
        ...
    end function pushVar(iJob_vn,iJob_v)
        eval([iJob_vn '=iJob_v;']);
    end
end
```

FIG. 6A

TECHNICAL COMPUTING ENVIRONMENT (TCE) 220

File   Edit   Tools   View   Execute

```
function pcaKmeansSch(X_tall,k,n,iJob)
% idx = pcaKmeansSch(X,k,n) performs k-means
% clustering on the first n principal
% components of the data X.

% Prelude code
c_tall = cov(X_tall);
mu_tall = mean(X_tall);

% Init nested variables
c = [];mu = [];idx_tall =[];

addNestedJob(iJob,@thunk1,@pushVar)

function iNext = thunk1()
    deferGather(iJob,{'c','mu'},{c_tall,mu_tall});
    iNext = @thunk2;
end function iNext = thunk2()
    coeff = pcacov(c);
    transformer = @(x) (x-mu)*coeff(:,n);
    score_tall = slicefun(transformer,X_tall);
    callJob(iJob,{'idx_tall'},@kmeans,score_tall,k)
    iNext = @thunk3;
end function iOut = thunk3()
    iOut = {idx_tall};
end function pushVar(iJob_vn,iJob_v)
    eval([iJob_vn '=iJob_v;']);
end end
```

FIG. 6B

SCHEDULER FOR TALL-GATHERING ALGORITHMS THAT INCLUDE CONTROL FLOW STATEMENTS

BRIEF DESCRIPTION OF THE DRAWINGS

FIGS. 5A-5D are diagrams of an example implementation illustrating code for an example algorithm.

FIGS. 6A and 6B are diagrams of an example implementation illustrating an example data structure.

DETAILED DESCRIPTION

Figure 1A:
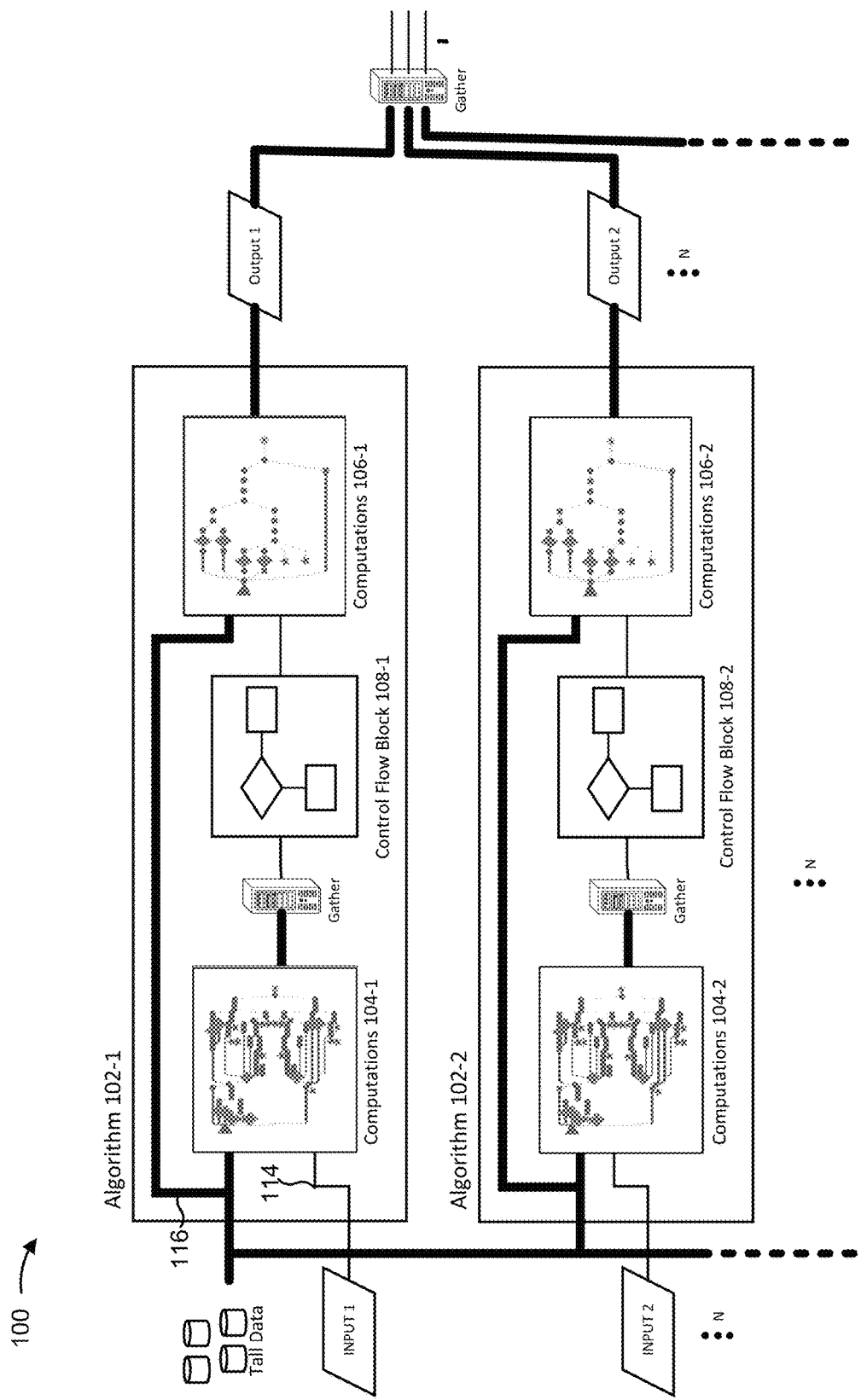
FIGS. 1A and 1B are diagrams of an overview of an example implementation described herein.

The following detailed description of example implementations refers to the accompanying drawings. The same reference numbers in different drawings may identify the same or similar elements.

Operations on tall data may be computationally costly due to tall data being too large to fit in local memory of a device executing programming code that performs operations on the tall data. For example, the tall data may be spread across multiple devices, servers, or the like, and/or may include a large quantity of data (e.g., hundreds of gigabytes, terabytes, petabytes, an unidentified quantity of data, etc.). More efficient analysis and processing of tall data is becoming increasingly necessary to effectively use the vast amount of data being gathered today (e.g., IoT data, medical records, information technology, etc.).

Program code (e.g., textual, graphical, or a hybrid of textual and graphical) that defines algorithms and/or functions to operate on the tall data to extract required data needs to have the tall data available each time the algorithms and/or functions execute. The computational cost of simply obtaining or gathering the tall data from non-local memory (e.g., memory outside of or remote to the device executing the program code) may be highly computationally costly compared to the computation on the tall data itself. Accordingly, reducing the number of operations on tall data that are needed to execute multiple algorithms/functions may reduce the number of times the tall data has to be read into cluster memory for processing, thereby conserving computing resources needed to execute the multiple algorithms/functions.

To reduce read operations on tall data, a computing system may accumulate a sequence of operations and their interdependencies (some operations may be dependent on the result of other operations and executed in a predetermined order), but not actually trigger any real computations until a later time. This delay in triggering a real computation is referred to herein as a deferred operation. Instead, when a result to the computations is requested, either by the user or by the program code, the computing system first combines or orders the operations to be performed to minimize the cost of accessing the tall data in the non-local storage.

However, iterative algorithms and/or algorithms with control flow statements may make it difficult to combine read operations on tall data to minimize data passes. For example, iterative algorithms on tall data trigger tall computations because algorithm tolerances need to be computed at each iteration and they depend on tall variables. Conventionally, a gather operation may be inserted into every algorithm at every iteration, however this increases the number of data passes. Additionally, control flow statements may cause branching of computations and/or looping that triggers a tall computation because the algorithm needs a tall variable to select a branch for execution. Thus, a gather operation may be needed in every algorithm before every control flow statement, thereby increasing the number of data passes. Therefore, reducing the number of operations on tall data can be difficult when multiple algorithms are executed concurrently and gather operations are inserted independently into algorithms. In other words, triggering tall computations inside an algorithm will prevent gather operations on the tall data from being shared between different algorithms because each read operation (e.g., an input/output (I/O) operation) is triggered within the algorithms independently.

Implementations, as described herein, provide a mechanism that shares or combines the gather operations inserted into the algorithms, rather than executing each gather operation separately, thereby reducing and/or minimizing the number of data passes required to execute the multiple algorithms. In some implementations, a scheduler may be provided for tall algorithms that include control flow statements and/or iterations that are dependent on tall computations. Implementations described herein define thunks for the tall algorithms. The boundaries of the thunks (e.g., a starting and ending location within the algorithm) may be determined by the places where tall variables were previously gathered. A scheduler executes the tall algorithms by calling individually the thunks from the tall algorithms and pausing when a gather operation is required. The scheduler will collectively gather the tall variables from different algorithms being executed concurrently by using an optimizer (e.g., a scheduler that orders, combines, and/or optimizes operations within a gather operation) to combine I/O operations for the algorithms. The scheduler may put back the gathered variables into the context of each algorithm (e.g., by providing the computed value of the variables), and the scheduler may resume with the next thunk for each algorithm. This process may be repeated until all algorithms are finished.

In this way, a device improves performance by conserving computer resources (e.g., processing resources, memory resources, communication resources, etc.) required to execute multiple tall algorithms concurrently and reduces the time required to perform operations on tall data. In some implementations, this approach may lead to faster hyperparameter tuning of tall data machine learning models by concurrent Bayesian optimization, improved visualization of two or more figures created from tall data in a same data pass, and/or faster cross-validation of tall data machine learning models.

In terms of real-world performance benefits, two experiments were run using a 12-machine cluster to measure SPARK performance. Each node of the 12-machine cluster included a pair of quad-core-Xeon-E5-2609 processors at 2.4 GHz w/o hyperthreading, 128 GB of RAM, and a RAID array of 7200 RPM drives. This processor was released in 2012 and used 32 nm lithography. The head node was used as a scheduler for SPARK jobs. These SPARK jobs were distributed to MATLAB workers across the remaining eleven nodes with access up to a total of 88 processor cores and 1408 GB of RAM. For these experiments, SPARK was configured to run 44 executors at once.

In Experiment 1, a k-means clustering algorithm for k=4, 5, 6, and 7 (four different numbers of clusters) was run over a dataset that was 200 GB stored into HADOOP. With the default SPARK configuration only 17 GB of the input data were cached into the SPARK executors RANI while the rest of the data was accessed from HADOOP. The algorithm was limited to run 10 loops of Lloyd-iterations. When running the four algorithms sequentially without using the scheduler described herein, the system took 41.83 minutes to complete the processing. On the other hand, when running the four algorithms sequentially using the scheduler described herein, the system took 14.22 minutes to complete the processing. In other words, the scheduler described herein achieved roughly a three times speed-up for the four concurrent instances of the k-means algorithm.

Experiment 2 used multiclass support vector machine (SVM) classification of images with digits. Four types of numeric digits were given to the classifier. Six binary SVM-classifiers discriminated between each combination of digits and a final class was selected after testing all the combinations. Each binary classifier may be trained sequentially (without the scheduler) or concurrently (using the scheduler). The SVM model was fitted using an iterative optimization approach that needed to revisit the training data for each iteration. The number of iterations was limited to 20. A corpus was used for training with 110 GB of data (~40 million images). Two configurations were tested. One where the data was cached in the SPARK executors RAM fully and another where the data was not cached was accessed directly from HADOOP. With caching, it took 1060 minutes to train 6 binary learns sequentially without the scheduler described herein, and it took only 510 minutes to train 6 binary learners concurrently using the scheduler described herein. Without caching, it took 1400 minutes to train 6 binary learns sequentially without the scheduler described herein, and it took only 530 minutes to train 6 binary learners concurrently using the scheduler described herein.

Accordingly, both Experiment 1 and Experiment 2 provide real-world examples of how a device may improve performance by using the scheduler described herein.

Figure 1B:
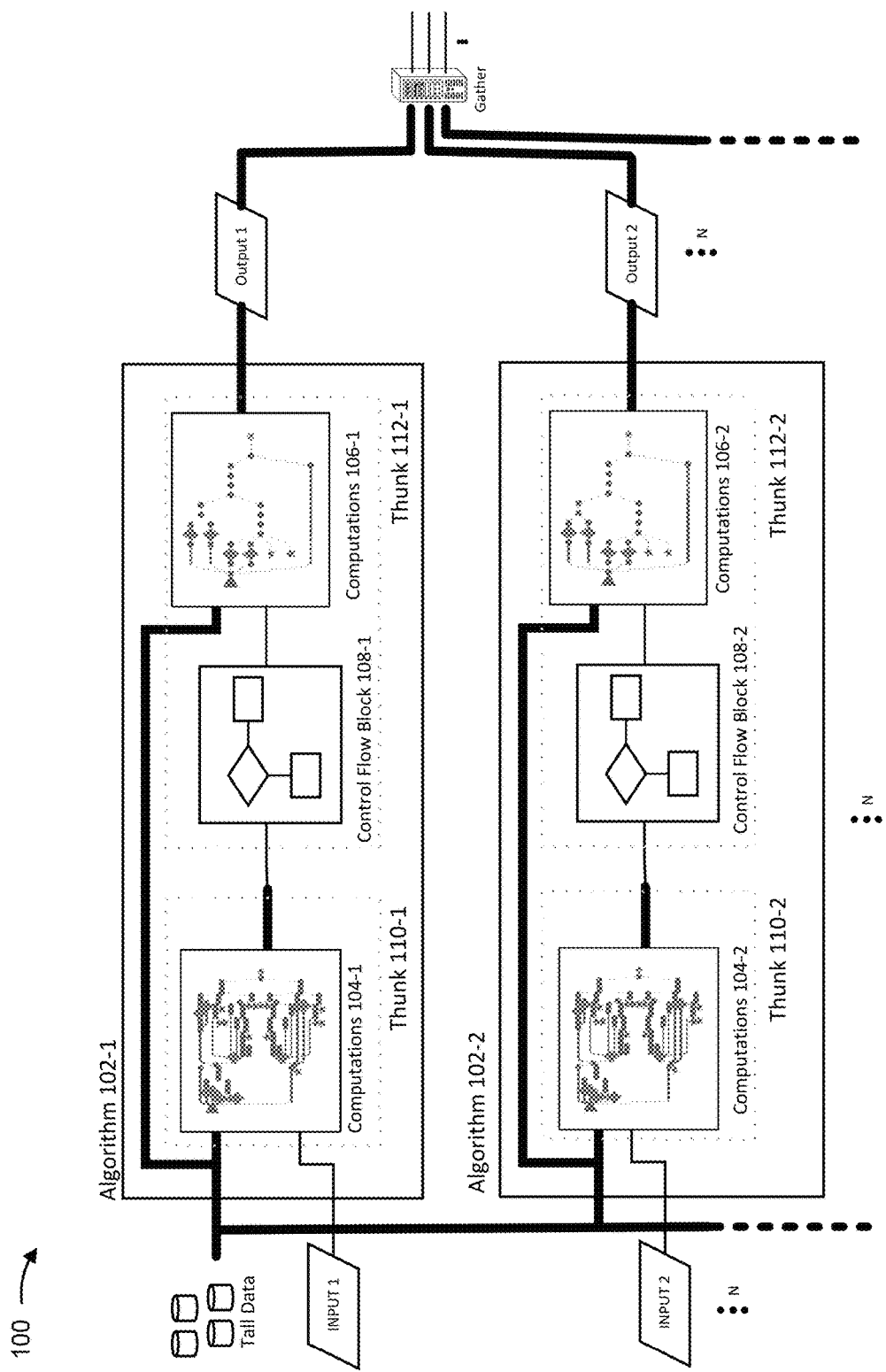

FIGS. 1A and 1B are diagrams of an overview of an example implementation 100 described herein. In example implementation 100, assume symmetric algorithms 102-1 to 102-N (N≥2) (e.g., multiple instances of the same algorithm 102) are to be executed concurrently within a client workspace (e.g., a technical computing environment (TCE)). For example, assume algorithm 102 needs to be applied to N different sets of workspace variables (Input 1, Input 2, etc.) and all algorithms 102-1 to 102-N using the same tall data. Each algorithm 102-1 to 102-N may include computations 104 and computations 106. Each of computations 104 and computations 106 may be a set of operations to implement a process that is operate with or on the tall data. Additionally, assume each algorithm 102-1 to 102-N includes a control flow block 108 that may include a control flow statement (e.g., if-then-else, switch-case, for-loops, and/or the like). Control flow block 108 depends on the output of computations 104. For example, a control flow statement associated with control flow block 108 may require the output of computations 104 to be evaluated. Also assume computations 106 require as input the output of control flow block 108. Further assume the thin connections 114 between blocks in FIGS. 1A and 1B represent one or more variables that are in a client workspace. The wide or bold connections 116 between blocks in FIGS. 1A and 1B represent one or more variables where at least one is a tall variable. The value of a tall variable may not yet be available and the computation of the tall variable value may require a tall computation be performed and tall data accessed (e.g., through I/O operations) that read the tall data into memory. Thus, because the output of computations 104 include at least one tall variable that serves as an input to control flow block 108, a tall computation must be performed before the control flow block 108 is executed and a branch of the control statement can be selected for execution. For example, the control flow statement associated with control flow block 108 may require the tall computation to be evaluated to select a branch for execution.

FIG. 1A illustrates an example where an explicit trigger of a tall computation is used by performing a gather operation in each algorithm 102-1 to 102-N between computations 104 and control flow block 108.

Assume the explicit triggering of the tall computations in each of algorithms 102-1 to 102-N is used because it is not possible to combine not yet executed I/O operations in algorithms 102-1 to 102-N due to the branching of a tall variable by control flow block 108. For example, a particular branch of algorithm 102 (e.g., within control flow blow 108) cannot be selected until the tall variable is computed and the remaining I/O operations cannot be determined. Thus, the remaining I/O operations left to be performed cannot be deferred to be combined at a later time because the I/O operations are dependent on selecting a branch. Accordingly, separate gather operations are inserted into each algorithm 102-1 to 102-N to trigger the required I/O operations needed to perform the tall computation for computations 104 when a manner for deferring the tall computations for computations 104 is not available.

As shown in FIG. 1A, N gather operations in total are performed for algorithms 102-1 to 102-N, each triggering a data pass on the tall data. Assume that computations 104 each use X data passes to perform the needed tall computation. This results in N·X data passes being used to perform the tall computations for computations 104-1 to 104-N because the data passes for computations 104-1 to 104-N are not combined within each algorithm 102-1 to 102-N.

On the other hand, data passes (e.g., I/O operations) for computations 106-1 to 106-N may be deferred and combined because no more control flow blocks are left to execute in algorithm 102 and no more branching occurs. Thus, after control flow block 108 is completed, all remaining I/O operations in algorithms 102-1 to 102-N may be determined, deferred, and used as a basis to combine data passes. Assume that computations 106 use Y data passes to perform the needed tall computation. Because all of computations 106-1 to 106-N are symmetric and require the same data passes, the data passes for each of computations 106-1 to 106-N may be combined and triggered by a same or synchronized gather operation. Accordingly, only Y data passes total are required to perform the tall computations for computations 106-1 to 106-N.

Thus, a total of N·X+Y data passes are required to produce results for algorithms 102-1 to 102-N when an explicit trigger of tall computations is used within algorithms 102-1 to 102-N to handle the branching on the tall variable caused by control flow blocks 108-1 to 108-N. N will typically be on the order of tens or hundreds, may be on the order of thousands or millions. The actual processing and memory cots for performing N·X+Y data passes may depend on several factors, such as the size of the dataset. However, as the total number of data passes increases, so will the cost.

FIG. 1B illustrates an example of the methods described herein that execute algorithms 102-1 to 102-2 using the scheduler described herein. For example, a device may generate a data structure for algorithms 102-1 to 102-N that defines thunks for each algorithm based on the control flow blocks 108-1 to 108-N and that schedule execution of the thunks to reduce required data passes on the tall data. A thunk is a subroutine used to inject an additional calculation into another subroutine that may delay or defer a calculation until a result is needed. For example, FIG. 6B illustrates an example of a thunk used to delay or defer a calculation by inserting a deferGather operation that marks a variable to be gathered after finishing a thunk. As used herein, "thunks" may be referred to as subroutines. For example, assume thunks are defined for algorithm 102 based on the control flow block 108 and such that an output of each thunk is expressed in terms of a deferred tall computation. For algorithm 102, this means that first thunk 110 is defined to include computations 104 and second thunk 112 is defined to include control flow block 108 and computations 106 based on the tall computation being required to execute control flow block 108. A data structure may be generated that includes information defining the thunks for algorithms 102-1 to 102-N, information defining a tall variable to defer gathering for each thunk, information defining how the thunks are chained, and/or information defining when algorithms 102-1 to 102-N are finished. FIGS. 6A and 6B exemplify one possible way to implement the data structure using subfunctions in a MATLAB script to define the thunks, and using a shared variable workspace (MATLAB nested function) to represent interdependencies between the thunks. Another possible implementation may be an object defining the thunks as object members (i.e. methods) and defining their interdependencies by object properties.

Based on analyzing the data structure (e.g., the information defining the thunks), a scheduler may schedule first thunks 110-1 to 110-N for concurrent execution of multiple computations without triggering a tall computation. The scheduler may individually pause execution of each algorithm 102-1 to 102-N based on completing all computations of a respective first thunk 110-1 to 110-N that do not require the tall computations. As referred to herein, execution of each of first thunk 110-1 to 110-N will be said to be "completed" when there are no more operations and/or computations that can be executed without triggering a tall computation. While paused, the device will maintain information for the thunks by storing the inputs and outputs of the executed computations The output of each first thunk 110-1 to 110-N is expressed in terms of a deferred tall computation (e.g., based on the information defining the tall variable from computations 104 and/or computations 106 to defer gathering included in the data structure). For example, the output is a tall variable and/or a representation of all operations in 104-1 that have been deferred and not triggered thus far. Once all of first thunks 110-1 to 110-N are completed and execution of algorithms 102-1 to 102-N is paused, the I/O operations needed to perform the deferred tall computations may be combined such that data passes on the tall data are reduced. In other words, the data passes for each of computations 104-1 to 104-N may be combined and triggered by a same or synchronized gather operation because there are known I/O operations that have been deferred and may be combined. For example, assuming computations 104-1 to 104-N each use X data passes to perform the deferred tall computation, then only X data passes total may be required to perform all deferred tall computations rather than X·N data passes as shown in FIG. 1A. Upon completion of the deferred tall computations for first thunks 110-1 to 110-N, the scheduler may put back the calculated tall variable(s) into the context of each algorithm 102-1 to 102-N. For example, the calculated tall variable(s) may be copied or added into the local workspace of a thunk (e.g., a subsequent thunk to be executed in the algorithm). More generally speaking, the scheduler puts back the calculated tall variable(s) by clearing the dependences of other thunks to these tall variables because the values of the tall variables may now be used.

Based on analyzing the data structure (e.g., the information defining how the thunks are chained), the scheduler may determine second thunks 112-1 to 112-N are the next thunks to be executed in each algorithm 102-1 to 102-N. For example, first thunks 110-1 to 110-N may return a function handle for second thunks 112-1 to 112-N that indicates second thunks 112-1 to 112-N are the next thunks to be executed. Based on analyzing the data structure (e.g., the information defining the thunks), the scheduler may schedule second thunks 112-1 to 112-N for concurrent execution without triggering a tall computation until all algorithms 102-1 to 102-N cannot proceed any further without a tall computation. Second thunks 112-1 to 112-N may be executed and the calculated tall variables from first thunks 110-1 to 110-N may be input to control flow blocks 108-1 to 108-N so that a branch may be selected and appropriate I/O operations for computations 106-1 to 106-N may be determined and deferred. As described with respect to FIG. 1A, the data passes for computations 106-1 to 106-N may be combined such that only Y data passes total are required to perform the tall computations for computations 106-1 to 106-N.

Thus, a total of X+Y data passes are required to produce results for algorithms 102-1 to 102-N when thunks are defined and scheduled as described herein. In other words, a device that executes the method shown in FIG. 1B may use fewer data passes (X+Y) than the data passes used by a device that executes the method shown in FIG. 1A (N·X+Y) to generate results for the same algorithms 102-1 to 102-N.

Accordingly, the device that executes the method shown in FIG. 1B may improve run-time performance with respect to the device that executes the method shown in FIG. 1A by reducing a quantity of I/O operations and/or data passes performed with regard to a batch of tall data. In this way, some implementations, as described herein, improve performance by conserving computer resources (e.g., processing resources, memory resources, communication resources, etc.) required to analyze tall data and reducing time required to perform operations on tall data.

As indicated above, FIGS. 1A and 1B are provided merely as examples. Other examples are possible, and may differ from what was described with regard to FIGS. 1A and 1B.

Figure 2:
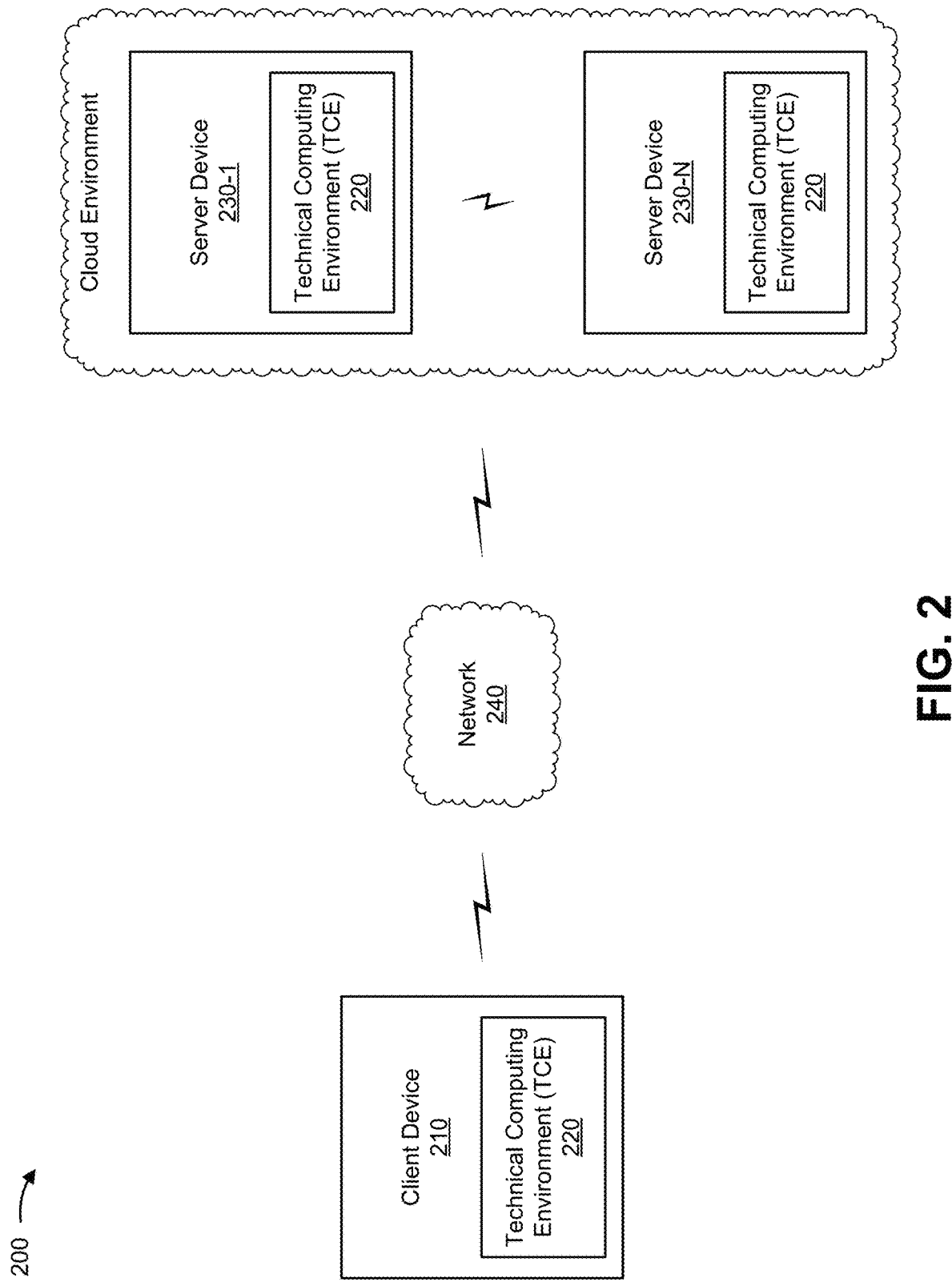
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, example environment 200 may include a client device 210, which may include a technical computing environment (TCE) 220. Furthermore, example environment 200 may include one or more server devices 230-1 through 230-N (N≥1) (hereinafter referred to collectively as "server devices 230," and individually as "server device 230), and a network 240. Server device 230 may include TCE 220. Devices of example environment 200 may interconnect via wired connections, wireless connections, or a combination of wired and wireless connections.

Client device 210 includes one or more devices capable of receiving, generating, storing, processing, and/or providing program code and/or information associated with program code. For example, client device 210 may include a computing device, such as a desktop computer, a laptop computer, a tablet computer, a mobile phone (e.g., a smart phone, a radiotelephone, etc.), or a similar device. In some implementations, client device 210 may receive information from and/or transmit information to server device 230.

Client device 210 may host TCE 220. TCE 220 may include any hardware-based component or a combination of hardware and software-based components that provides a computing environment that allows tasks to be performed (e.g., by users) related to disciplines, such as, but not limited to, mathematics, science, engineering, medicine, and business. TCE 220 may include a text-based environment (e.g., MATLAB® software by The MathWorks, Inc.). The text-based environment may be a language/programming environment that supports late binding or dynaitc typing, as opposed to describing a late binding language or a dynamic typed language/environment. Additionally, or alternatively, TCE 220 may include a graphically-based environment (e.g., Simulink® software, Stateflow® software, SimEvents® software, Simscape® software, etc., by The MathWorks, Inc.; VisSim by Visual Solutions; LabView® by National Instruments; Agilent VEE by Agilent Technologies; Advanced Design System (ADS) by Agilent Technologies; Agilent Ptolemy by Agilent Technologies; etc.). The graphically-based environment may include a modelling environment for modelling a system and/or a simulation environment for simulating behavior of a system. TCE 220 may include another type of environment, such as a hybrid environment that may include, for example, a text-based environment and a graphically-based environment. In some implementations, TCE 220 may include a Modelica based environment, such as Dymola, MapleSim, OpenModelica, JModelica, etc. Other possible environments may include GT Suite, XLINK by Gamma Technologies, CarMaker by IPG, AVL Model Connect, xMOD, CosiMate.

Server device 230 includes one or more devices capable of receiving, generating, storing, processing, and/or providing program code and/or information associated with program code. For example, server device 230 may include a computing device, such as a server, a desktop computer, a laptop computer, a tablet computer, or a similar device. In some implementations, server device 230 may host TCE 220. In some implementations, client device 210 may be used to access one or more TCEs 220 running on one or more server devices 230. For example, multiple server devices 230 may be used to execute program code (e.g., serially or in parallel), and may provide respective results of executing the program code to client device 210.

In some implementations, client device 210 and server device 230 may be owned by different entities. For example, an end user may own client device 210, and a third party may own server device 230. In some implementations, server device 230 may include a device operating in a cloud computing environment. In this way, front-end applications (e.g., a user interface) may be separated from back-end applications (e.g., program code execution). Additionally, or alternatively, server device 230 may perform one, more, or all operations described elsewhere herein as being performed by client device 210.

As shown, in some implementations, server device 230 may include one or more devices operating in a cloud computing environment. For example, server device 230 may be associated with a cloud data storage service, a cluster computing environment, or the like. In such a case, a batch of data may be distributed among and/or processed by multiple server devices 230. Additionally, or alternatively, portions of a batch of data may be distributed among and/or processed by multiple server devices 230. Additionally, or alternatively, a batch of data may be distributed among and/or processed by multiple, different logical pools of a particular server device 230.

Network 240 includes one or more wired and/or wireless networks. For example, network 240 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, a private network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of example environment 200 may perform one or more functions described as being performed by another set of devices of example environment 200.

Figure 3:
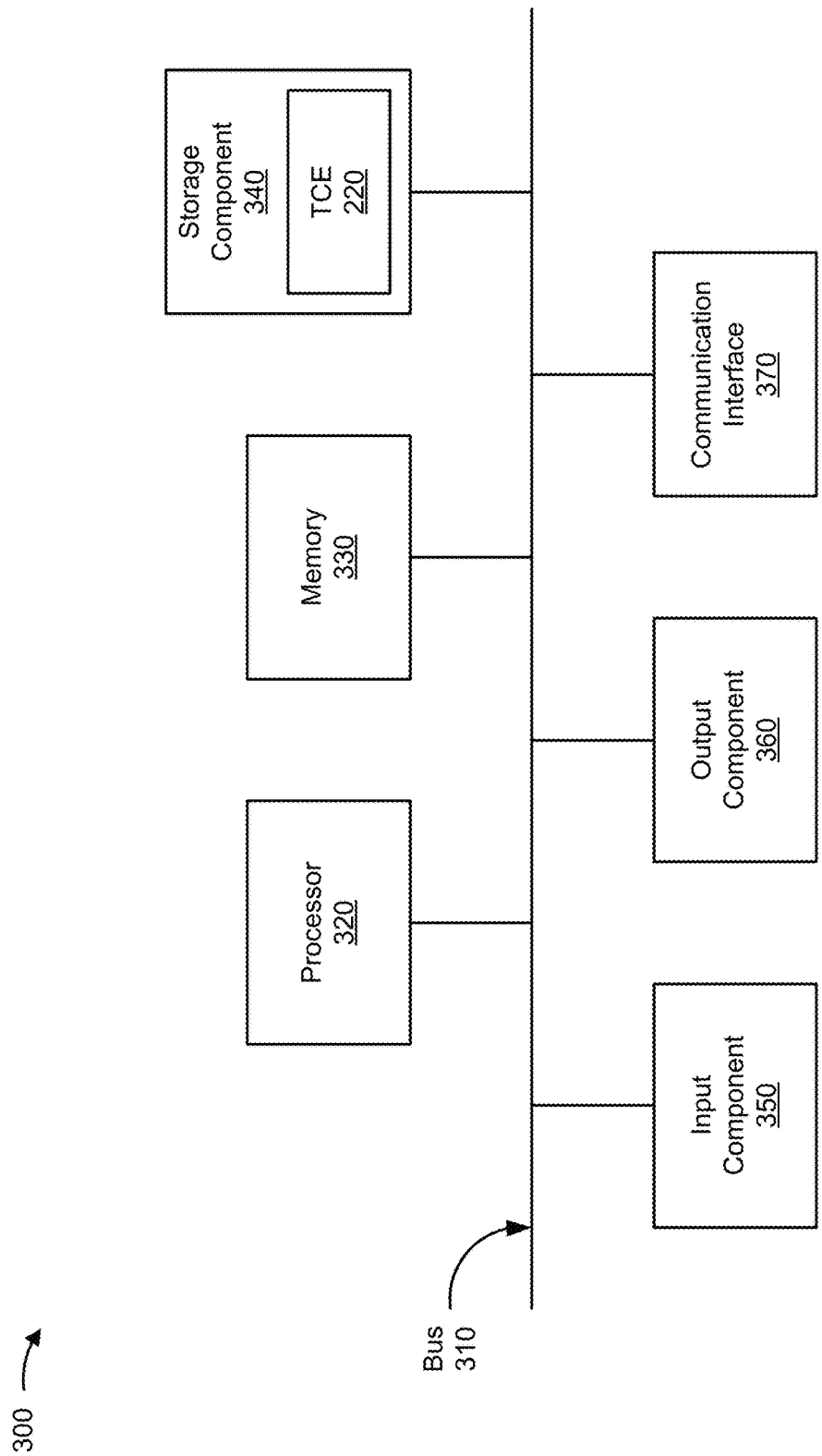
FIG. 3 is a diagram of example components of a device used herein.

FIG. 3 is a diagram of example components of a device 300. Device 300 may correspond to client device 210 and/or server device 230. In some implementations, client device 210 and/or server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 takes the form of a central processing unit (CPU), a graphics processing unit (GPU), an accelerated processing unit (APU), a microprocessor, a microcontroller, a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes (e.g., a computer-implemented method) in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4A:
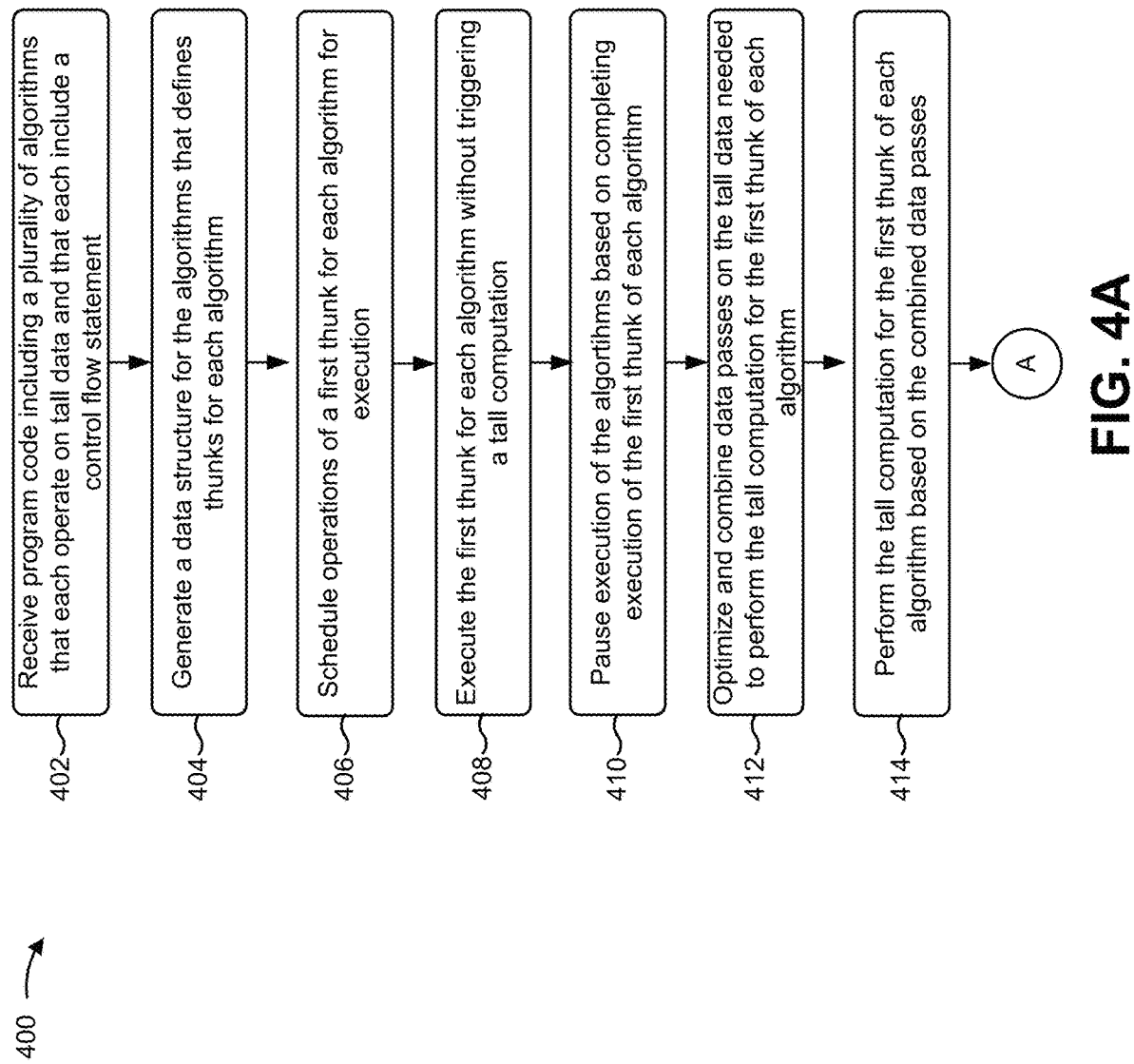
FIGS. 4A and 4B are flow charts of an example process for executing multiple tall-gathering algorithms that include control flow statements.
Figure 4B:
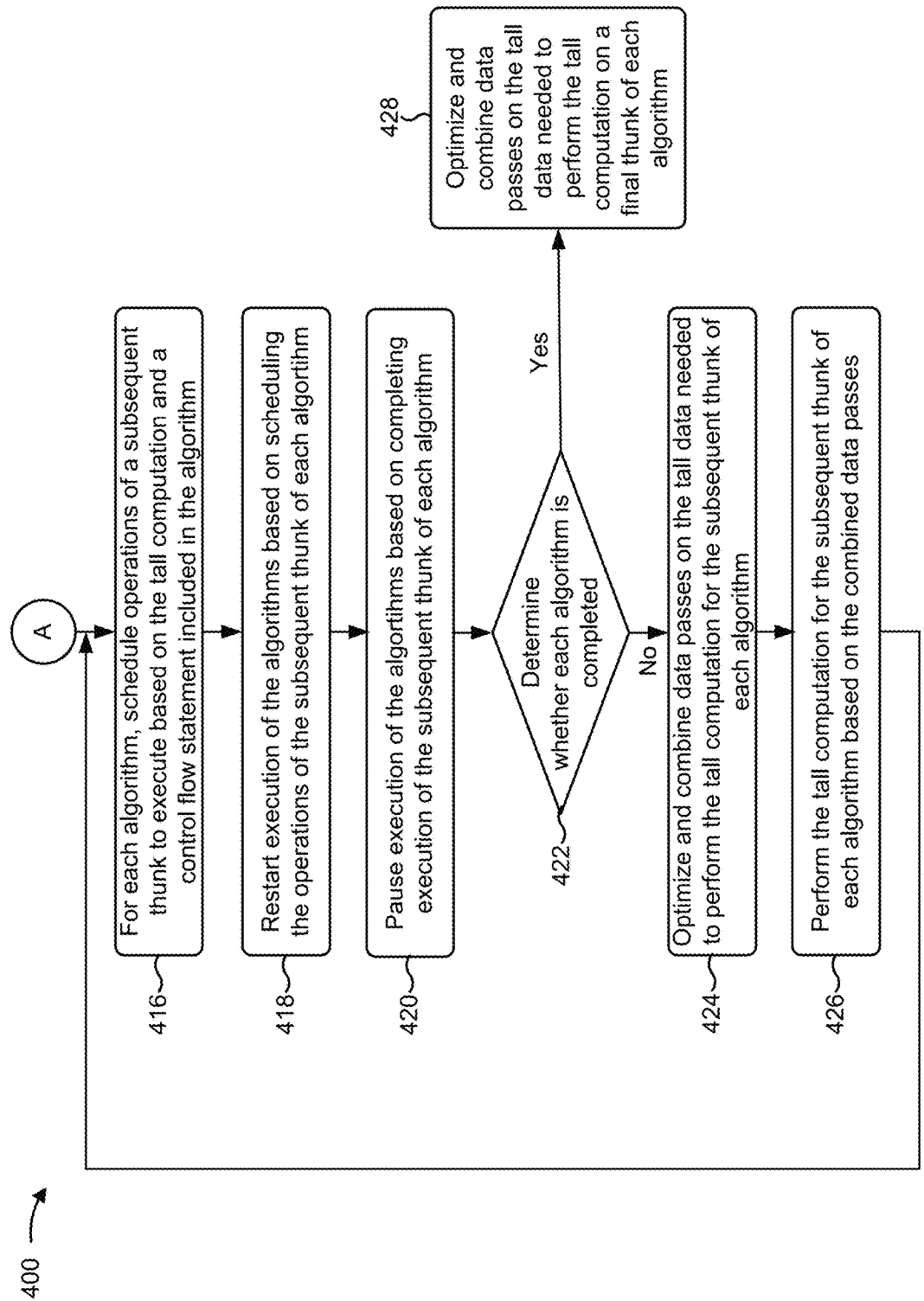

FIGS. 4A and 4B are flow charts of an example process 400 for executing multiple tall-gathering algorithms that include control flow statements. In some implementations, one or more process blocks of FIGS. 4A and 4B may be performed by client device 210. In some implementations, one or more process blocks of FIGS. 4A and 4B may be performed by another device or a group of devices separate from or including client device 210, such as server device 230.

As shown in FIG. 4A, process 400 may include receiving program code including a plurality of algorithms that each operate on tall data and that each include a control flow statement (block 402). For example, client device 210 may receive the program code based on a user input (e.g., based on a user inputting the program code, etc.), may obtain the program code from storage (e.g., from local storage, from server device 230, based on a user input specifying a location at which the program code is stored, etc.), may download the program code from a web server, and/or the like.

Algorithms included in the program code may include a set of operations (e.g., computations) that implement a process or a methodology that is prepared to work with the tall data. The set of operations may include at least one of an aggregation operation, a slice-wise operation, a filter operation, a union operation, a re-partition operation, an element-wise operation, a reduction operation, a cache operation, function calls, etc. Other operations are possible (e.g., combinations of the above operations, operations not listed above, combinations of the above operations and operations not listed above, etc.), and implementations described herein are not intended to be limited to the operations listed above.

Each algorithm includes at least one control flow statement. A control flow statement may break up the flow of execution of an algorithm by employing decision making, looping, and/or branching (e.g., based on or associated with a tall computation for a tall variable), thereby enabling the algorithm to conditionally execute particular portions of code. The control flow statement may include an if-then statement, an if-then-else statement, a switch statement, a for statement, a while statement, a do-while statement, a break statement, a continue statement, a return statement, and/or the like. In some implementations, the control flow statement may create an iterative algorithm that operates iteratively (e.g., for a particular number of iterations).

Algorithms included in the program code trigger an evaluation of at least one tall variable (i.e., a tall computation) to be able to produce an output. In other words, an output of an algorithm cannot be produced without performing a tall computation to evaluate a tall variable at some point. Each of the algorithms may include an evaluation of a same tall variable and/or different tall variables. The algorithms may include multiple versions of the same algorithm (symmetric algorithms), different or distinct algorithms (asymmetric algorithms), or a combination thereof. Additionally, or alternatively, one or more of the algorithms may be an iterative algorithm that uses an initial guess or value to generate a sequence of improving approximate solutions using a number of iterations. Each iteration may include an evaluation of a tall variable and each iteration may require a data pass on the tall data to perform the evaluation of the tall variable.

The tall data (or big data) may be data that is too large to fit in local memory (e.g., random-access memory (RAM), local disk space, disk space on any one device, a cache of a device, etc.). In some cases, the tall data may be spread across multiple devices, servers, and/or the like, and/or may include a large quantity of data (e.g., hundreds of gigabytes, terabytes, petabytes, an unidentified quantity of data, etc.). The tall data may include data of a particular data type, such as a table data type, a double data type, a single data type, an int8 data type, an int16 data type, an int32 data type, an int64 data type, a uint8 data type, a uint16 data type, a uint32 data type, a uint64 data type, a logical data type, a character data type, a datetime data type, a duration data type, a calendar duration data type, a string data type, a cell data type, a structure data type, an image data type, a video data type, or any other data type. For example, the tall data may include an array of elements of the particular data type. In some implementations, the tall data may include elements of multiple, different data types.

As further shown in FIG. 4A, process 400 may include generating a data structure for the algorithms that defines thunks for each algorithm (block 404). For example, client device 210 (e.g., TCE 220) may generate a data structure such as a tree, an abstract syntax tree, a directed graph, an object, or the like.

In some implementations, the data structure may be an object where thunks are defined with object members and are fields of the object. Using MATLAB nested functions, thunks may be subfunctions in a script, where the inputs and outputs of the thunks are not required to be saved in the data structure because thunks share a common variable workspace. Accordingly, the data structure may indicate variables that need to be manually gathered.

In some implementations, client device 210 may generate the data structure based on user input (e.g., program code input by the user) that represent the algorithm(s). For each algorithm, the data structure may include prelude code, information for initialization of nested variables, information defining thunks for the algorithm, information defining a tall variable to defer gathering, information defining how the thunks are chained, and/or information defining when the algorithm is finished. In other words, and as will be described in more detail below, the data structure includes information defining the thunks, the inputs and outputs of the thunks, how each thunk resolves that is the subsequent thunk to execute, and inputs and outputs to the algorithm.

The prelude code for an algorithm may include code for the algorithm that can be executed without triggering a gather operation. For example, the prelude code may include code that does not require a tall computation or an evaluation of a tall variable. The information for initialization of nested variables may initialize any variable not yet defined in a workspace and used across thunks. The nested variables may include tall variables and non-tall variables.

The information defining thunks may define multiple thunks for each algorithm. Each thunk may be defined such that an output of the thunk is expressed in terms of a deferred tall computation for at least one tall variable. For example, the thunks may be defined based on where a gather operation would conventionally be required to perform a tall computation.

The thunks may be defined based on a control flow statement included in the algorithm. A control flow statement may be included in a thunk with other computations or the control flow statement may be defined as a thunk itself without other computations. In some implementations, a thunk may begin or end based on the control flow statement. For instance, a thunk may begin with a control flow statement when the input of the control flow statement depends on a tall computation being computed. As another example, thunks may be defined such that a control flow statement separates thunks when branching requires explicit trigger of tall computations. In other words, the computations before a control flow statement may be included in thunk A, the control flow statement itself may be included in thunk B, and additional thunks may be defined for branches of the control flow statement. For example, a first branch of a control flow statement be associated with a thunk C and a second branch of the control flow statement may be associated with a thunk D based on the branching requiring an explicit trigger of tall computations.

In some implementations, a thunk may include one or more nested functions. A nested function is a function that is completely contained within a parent function. A nested function differs from other types of functions because a nested function can access and modify variables that are defined in their parent function(s). As a result, a nested function can use variables that are not explicitly passed as input arguments. Additionally, in a parent function, a handle can be created to a nested function that contains the data necessary to run the nested function. In some implementations, a nested function of a thunk can be defined within a control flow statement.

The information defining a tall variable to defer gathering indicates at least one tall variable that requires a gather operation that is be deferred to complete a tall computation. In other words, the information defining the tall variable to defer may mark a tall variable (e.g., a nested variable) to be gathered after finishing execution of thunk and placed back into the context of a job by assigning its gathered value to the tall variable.

The information defining how the thunks are chained indicates a subsequent thunk to execute after completion of a prior thunk. For example, an output argument of a thunk may indicate a next thunk to execute by returning a function handle for the next thunk. The information defining when the algorithm is finished indicates the last thunk to execute to finish the algorithm. For example, a thunk that returns an output that is not a function handle (e.g., anything other than a function handle) is the last thunk in the algorithm.

As shown in FIG. 4A, process 400 may include scheduling operations of a first thunk for each algorithm for execution (block 406). For example, a scheduler of client device 210 (e.g., TCE 220) may analyze the data structure to identify a first thunk for each algorithm. The scheduler may be a program or algorithm executed by client device 210. Specifically, the scheduler may analyze the information defining the thunks in the data structure to identify a thunk for each algorithm that does not require an input that depends on a tall computation being computed. The scheduler may schedule operations of the first thunk for each algorithm by scheduling jobs for the first thunks and assigning available computing resources to perform the jobs at defined times.

As shown in FIG. 4A, process 400 may include executing the first thunk for each algorithm without triggering a tall computation (block 408). For example, client device 210 (e.g., TCE 220) may execute the operations and/or computations within the first thunk for each algorithm concurrently and/or in parallel by calling the first thunk (e.g., nested functions) from each algorithm. In some implementations, each first thunk is compiled and executed without triggering a tall computation based on the information defining a tall variable to defer gathering in the data structure. For example, client device 210 (e.g., TCE 220) may identify the tall variable(s) based on the information defining the tall variable and complete execution of the first thunk once the tall variable(s) are deferred for gathering without triggering the tall computation at this time.

As shown in FIG. 4A, process 400 may include pausing execution of the algorithms based on completing execution of the first thunk of each algorithm (block 410). For example, client device 210 (e.g., TCE 220) may individually pause execution of an algorithm once the first thunk for the algorithm is completed and requires a tall computation be triggered. In other words, the first thunk for the algorithm may be completed when there are no more computations or operations within the thunk that can be executed without triggering a tall computation. Because each algorithm is individually paused based on the execution status of the first thunk (e.g., completed or not completed), the algorithms may be paused at different times. In other words, all the algorithms may not be paused at a same time. Client device 210 may wait until all algorithms are paused before proceeding to block 412.

The scheduler may control the number of thunks that are concurrently executed to prevent exhausting local memory usage and/or overloading the processing resources. If one thunk completes execution before another concurrently executed thunk, the scheduler may add a new pending task on-the-fly to execute another thunk from a paused algorithm.

As shown in FIG. 4A, process 400 may include optimizing and combining data passes on the tall data needed to perform the tall computation for the first thunk of each algorithm (block 412). For example, once all algorithms are paused, the scheduler of client device 210 (e.g., TCE 220) may identify the output of each of the deferred tall computations for each algorithm. In some implementations, the scheduler may combine all the tall variables from the first thunk of all the algorithms. In some implementations, the scheduler may combine all the tall variables for each iteration of the first thunk of all the algorithms. The scheduler may analyze the outputs of the deferred tall computations and/or the tall variables and may combine data passes on the tall data needed to perform the tall computations for the different algorithms. For example, rather than performing separate I/O operations (e.g., a read operation) for each algorithm once the first thunks have been completed, the I/O operations required for the tall computations for the algorithms may be shared, combined, and/or reordered to reduce and/or minimize the total number of I/O operations relative to performing separate I/O operations for each algorithm. An example of how the data passes may be optimized and combined is described in U.S. patent application Ser. No. 15/216,493, "TALL DATA READ-WRITE REDUCTION," filed Jul. 21, 2016, which is incorporated herein by reference.

The scheduler may execute a gather operation while the execution of all the algorithms is paused based on the combined I/O operations for all the first thunks. The gather operation may cause client device 210 to collect the tall data (e.g., a tall array) into memory to execute the combined I/O operations to combine the data passes. In other words, at this point in process 400 the deferred tall computations for the tall variables from the first thunks may be triggered for all algorithms.

As shown in FIG. 4A, process 400 may include performing the tall computation for the first thunk of each algorithm based on the combined data passes (block 414). For example, client device 210 (e.g., TCE 220) may perform the tall computations to generate a calculated tall variable(s). The scheduler may identify which calculated tall variable(s) is associated with each algorithm based on the data structure (e.g., based on the information defining a tall variable to defer gathering) and the scheduler may put back the calculated tall variable(s) into the context of each algorithm. In other words, the computed tall variables may be returned to the algorithms for use in future calculations. In some implementations, an input to a control flow statement may be generated based on putting back the calculated tall variable into the context of the algorithm. Additionally, or alternatively, an input for a subsequent iteration of the algorithm may be generated based on putting back the calculated tall variable into the context of the algorithm As shown in FIG. 4B, process 400 may include, for each algorithm, scheduling operations of a subsequent thunk to execute based on the tall computation and a control flow statement included in the algorithm (block 416). For example, for each algorithm, the scheduler of client device 210 (e.g., TCE 220) may determine a subsequent thunk to execute (possibly based on the control flow statement) and then determine operations of the subsequent thunk to execute (possibly based on the control flow statement).

Initially, the scheduler may determine a subsequent thunk to execute based on the data structure (e.g., the information defining on how the thunks are chained). For example, a previous thunk (i.e., a most recently executed subroutine and/or thunk that completed execution in the algorithm) may return a function handle identifying the next or subsequent thunk to execute. In some implementations, the function handle may be returned based on a control flow statement included in the previous thunk that requires an input based on a tall computation. For example, a previous thunk may end with or otherwise include a control flow statement that branches into multiple thunks that each trigger a tall computation. In such a case, each branch of the control flow statement may return a different function handle corresponding to a different thunk that triggers a tall computation. The scheduler may determine a function handle returned from the previous thunk based on inputting a calculated tall variable computed using a previous tall computation into the control flow statement. The subsequent thunk may correspond to the function handle returned by the previous thunk. In this way, branches of the control flow statement that are not selected and the corresponding thunks that trigger tall computations may be avoided.

Once the scheduler determines the subsequent thunk to execute for each algorithm, the scheduler may determine operations of the subsequent thunk based on the data structure (e.g., the information defining the thunks). For example, the information defining the thunks may indicate that the subsequent thunk begins with or otherwise includes a control flow statement that requires an input based on a tall computation, but that branches into multiple thunks that do not trigger a tall computation. In such a case, the scheduler may input a value generated based on a previous tall computation into the control flow statement to determine a branch of operations to follow. In this way, branches of the control flow statement that are not selected and the corresponding operations of the unselected branches may be avoided.

Based on determining the operations of the subsequent thunk to execute, the scheduler may schedule the operations of the subsequent thunk for each algorithm by scheduling jobs for the subsequent thunks and assigning available computing resources to perform the jobs at defined times.

As shown in FIG. 4B, process 400 may include restarting execution of the algorithms based on scheduling the operations of the subsequent thunk of each algorithm (block 418). For example, client device 210 (e.g., TCE 220) may execute the operations and/or computations within the subsequent thunk for each algorithm concurrently and/or in parallel by calling the subsequent thunk (e.g., nested functions) from each algorithm. In some implementations, each subsequent thunk is executed without triggering a tall computation based on the information defining a tall variable to defer gathering in the data structure. For example, client device 210 (e.g., TCE 220) may identify the tall variable(s) based on the information defining the tall variable and complete execution of the subsequent thunk once the tall variable(s) are deferred for gathering without triggering a tall computation at this time.

As shown in FIG. 4B, process 400 may include pausing execution of the algorithms based on completing execution of the subsequent thunk of each algorithm (block 420). For example, client device 210 (e.g., TCE 220) may individually pause execution of an algorithm once the subsequent thunk for the algorithm is completed and requires a tall computation be triggered. Because each algorithm is individually paused based on the execution status of the subsequent thunk (e.g., completed or not completed), the algorithms may be paused at different times. In other words, all the algorithms may not be paused at a same time. Client device 210 may wait until all algorithms are paused before proceeding to block 424.

As shown in FIG. 4B, process 400 may include determining whether each algorithm is completed (block 422). For example, the scheduler of client device 210 (e.g., TCE 220) may analyze the data structure (e.g., the information defining when the algorithm is finished) to determine whether the subsequent thunk for each algorithm is the last thunk in the algorithm and the algorithm is completed.

If a subsequent thunk returns an output that is a function handle, then the scheduler determines that the subsequent thunk is not the last thunk for the algorithm and continues to block 424. If a subsequent thunk returns an output that is not a function handle, then the scheduler determines that the subsequent thunk is the last thunk for the algorithm and the algorithm is competed. When an algorithm is determined to be completed, the scheduler may hold an output of the algorithm (e.g., expressed in terms of a deferred tall computation for at least one tall variable) for future query. When all the algorithms are determined to be completed, the scheduler may proceed to block 428.

As shown in FIG. 4B, if at least one algorithm is determined not to be completed (block 422—NO), process 400 may include optimizing and combining data passes on the tall data needed to perform the tall computation for the subsequent thunk of each algorithm that is not completed (block 424). For example, once all algorithms are paused, the scheduler of client device 210 (e.g., TCE 220) may identify the output of each of the deferred tall computations for each algorithm that has not been completed. In some implementations, the scheduler may combine all the tall variables from the subsequent thunk of all the algorithms. The scheduler may analyze the outputs of the deferred tall computations and/or the tall variables and may combine data passes on the tall data needed to perform the tall computations for the different algorithms. For example, rather than performing separate I/O operations (e.g., a read operation) for each algorithm once the subsequent thunks have been completed, the I/O operations required for the tall computations for the algorithms may be shared, combined, and/or reordered to reduce and/or minimize the total number of I/O operations relative to performing separate I/O operations for each algorithm. Data passes may be optimized and combined in the same manner for the first thunks and subsequent thunks.

The scheduler may execute a gather operation while the execution of all the algorithms is paused based on the combined I/O operations for all the subsequent thunks. The gather operation may cause client device 210 to collect the tall data (e.g., a tall array) into memory to execute the combined I/O operations to combine the data passes. In other words, at this point in process 400, the deferred tall computations for the tall variables from the subsequent thunks may be triggered for all algorithms.

As shown in FIG. 4B, process 400 may include performing the tall computation for the subsequent thunk of each algorithm based on the combined data passes (block 426). For example, client device 210 (e.g., TCE 220) may perform the tall computations to generate a calculated tall variable(s). The scheduler may identify which calculated tall variable(s) is associated with each algorithm based on the data structure (e.g., based on the information defining a tall variable to defer gathering) and the scheduler may put back the calculated tall variable(s) into the context of each algorithm. Process 400 may return to block 416 to schedule operations for another subsequent thunk for each algorithm that is not completed.

As shown in FIG. 4B, if each algorithm is determined to be completed (block 422—YES), process 400 may include optimizing and combining data passes on the tall data needed to perform the tall computation on a final thunk of each algorithm (block 428). For example, once all algorithms are paused after completion of the final thunk, the scheduler of client device 210 (e.g., TCE 220) may identify the output of each of the deferred tall computations for each algorithm that has been completed. In some implementations, the scheduler may combine all the tall variables from the final thunk of all the algorithms. The scheduler may analyze the outputs of the deferred tall computations and/or the tall variables and may combine data passes on the tall data needed to perform the tall computations for the different algorithms. For example, rather than performing separate I/O operations (e.g., a read operation) for each algorithm once the subsequent thunks have been completed, the I/O operations required for the tall computations for the algorithms may be shared, combined, and/or reordered to reduce and/or minimize the total number of I/O operations relative to performing separate I/O operations for each algorithm. Data passes may be optimized and combined in the same manner for the first thunks, subsequent thunks, and final thunks.

The scheduler may execute a gather operation when the execution of all the algorithms is completed based on the combined I/O operations for all the final thunks. The gather operation may cause client device 210 to collect the tall data (e.g., a tall array) into memory to execute the combined I/O operations to combine the data passes. In other words, at this point in process 400 the deferred tall computations for the tall variables from the final thunks may be triggered for all algorithms.

Although FIGS. 4A and 4B show example blocks of process 400, in some implementations, process 400 may include additional blocks, fewer blocks, different blocks, or differently arranged blocks than those depicted in FIGS. 4A and 4B. Additionally, or alternatively, two or more of the blocks of process 400 may be performed concurrently and/or in parallel.

Figure 5B:
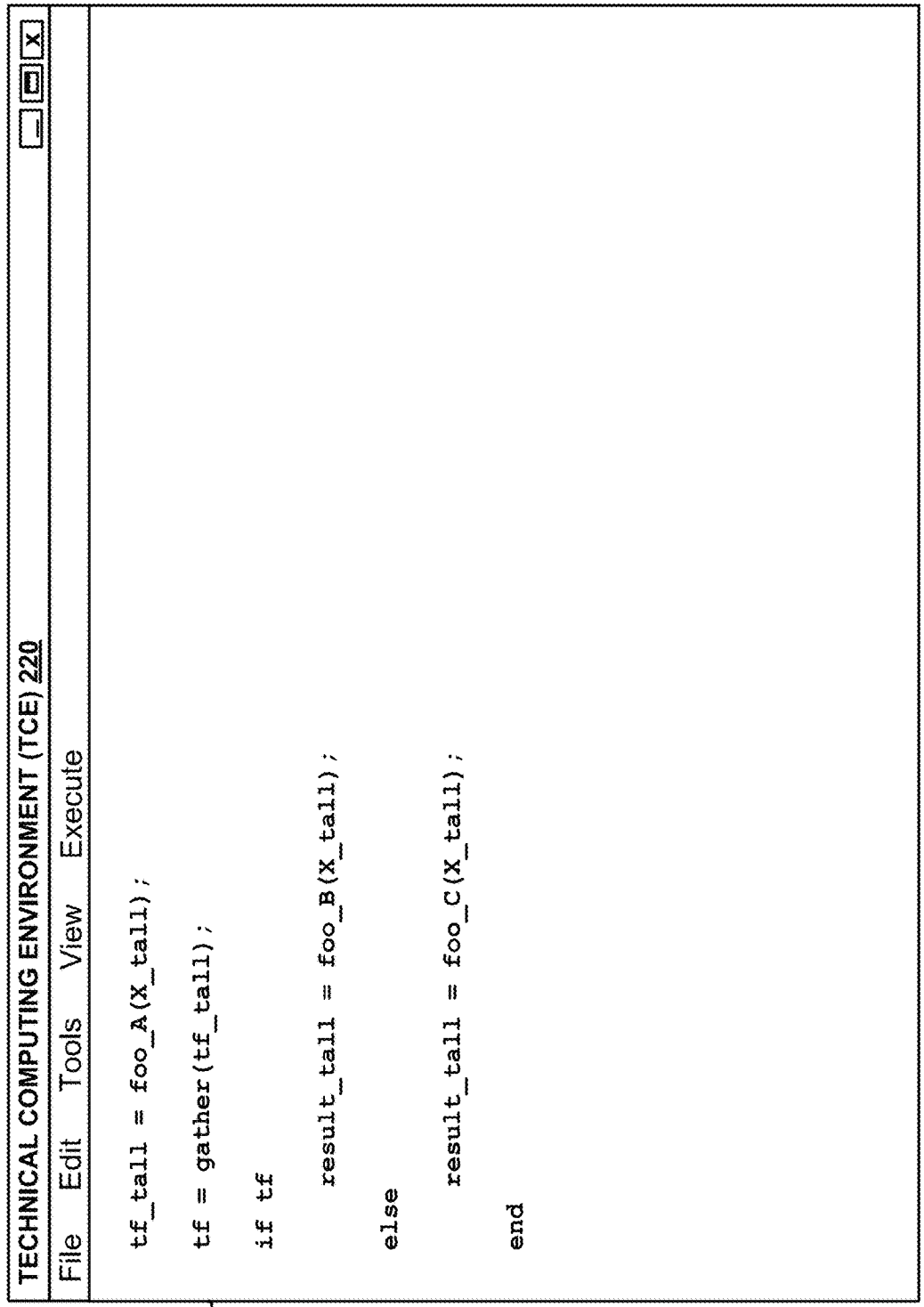

FIGS. 5A-5D are diagrams of an example implementation 500 illustrating code for an example algorithm. In FIG. 5A, code 502 may contain a tall algorithm with a control flow statement (e.g., an if-else statement) that results in branching on a tall variable (e.g., X_tall). This branching can be handled using the methodologies/systems described above to reduce the number of data passes on the tall data for X_tall needed to perform the tall computations for the tall variable X_tall.

FIG. 5B illustrates code 504 that handles the branches by a programmer explicitly placing a gather operation (e.g., tf=gather (tf_tall)) before the branching occurs. This approach may be similar to that described with respect to FIG. 1A where gather operations are added before control flow statement. However, this approach may not allow internal gathers (e.g., gathers within an instance of the algorithm) for the algorithms to be combined when running multiple instances of the tall algorithm with the same data.

Figure 5C:
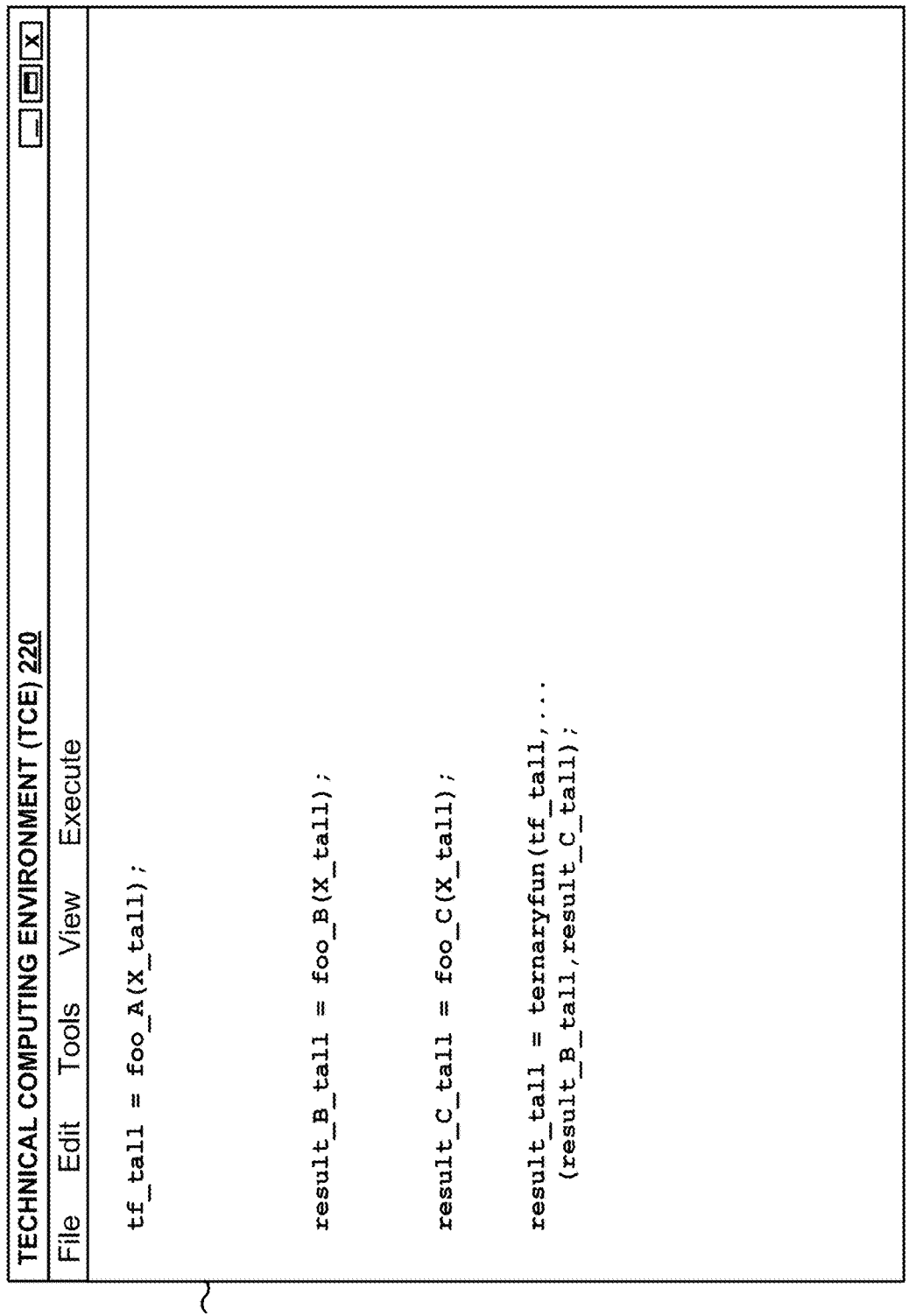

FIG. 5C illustrates code 506 that handles the branches by executing both branches of the if statement and making a final assignment (e.g., pick a branch) when the data passes may possibly, but not always, be combined with other data passes. This approach can lead to obfuscated code and a waste of processing cycles computing results of a branch that will ultimately be discarded.

FIG. 5D illustrates code 508 that defines thunks for the algorithm using the methodologies and systems described in connection with FIGS. 4A and 4B. In this case, a scheduler may call thunk_1 and gather tf_tall. The scheduler may then evaluate thunk_2 because tf_tall is available. Unlike code 504, when running multiple instances of the algorithm concurrently or in parallel, the scheduler will now be able to combine the (internal) gathers for tf_tall among all instances of the algorithm as described in FIGS. 4A and 4B. Moreover, unlike code 506, only results of a selected branch may be computed by executing the selected branch without executing another branch of the control flow statement that is not selected.

As indicated above, FIGS. 5A-5D are provided merely as an example. Other examples may differ from what was described with regard to FIGS. 5A-5D.

FIGS. 6A and 6B are diagrams of an example implementation 600 illustrating an example data structure. FIG. 6A shows a template or skeleton that may be used to write code 602 for the data structure. Code 602 may represent one algorithm of the algorithms included in the data structure. In practice, the data structure can have code for multiple algorithms that follow the same or a similar template or skeleton shown in FIG. 6A.

The prelude code may be code of the algorithm that can be executed without triggering a gather operation. The initialization of nested variables may include code that initializes in the workspace any variable not yet defined across thunks.

In code 602, thunks are implemented as nested functions and represent the information defining the thunks (e.g., thunk_( )). The thunks are chained by using an output argument and represent the information defining how the thunks are chained (e.g., function iNext=thunk_1( )). The scheduler may implement conditional branching by based on the output argument of iNext of the most recently executed thunk to determine what is the next thunk to execute. When the scheduler determines which thunk(s) to execute, then the scheduler avoids running code to generate results that would be discarded anyway, and thus avoids the strategy discussed with respect to FIG. 5C.

The scheduler, based on addNestedJob (a function that adds current context as a nested job), links the current context (the function workspace that stores variables) to a job. addNestedJob may also instruct the scheduler which is the first thunk to execute and pass a function handle to pushVar. pushVar is a helper function that the scheduler uses to push variables into the function workspace. In some implementations, pushVar must exist for the scheduler to function properly.

The last thunk returns an output of the algorithm rather than a function handle, which represents the information defining when the algorithm is finished. The scheduler will determine the last thunk when the output of a thunk is not a function handle.

FIG. 6B illustrates a specific example of the template or skeleton code 602. As shown in code 604, the function deferGather is used to mark a variable to be gathered after finishing a thunk, which represents the information defining a tall variable to defer gathering in the data structure.

As indicated above, FIGS. 6A and 6B are provided merely as an example. Other examples may differ from what was described with regard to FIGS. 6A and 6B.

FIGS. 7A-10B are diagrams of example implementations that may use process 400 to output results for tall-gathering algorithms that include control flow statements. FIGS. 7A-10B are illustrated with common definitions and illustrations. For example, assume an input n represents one or more variables in a client workspace and are inputs to algorithm m. Output n may represent one or more variables that are outputs to algorithm m. Output n can be in the client workspace (e.g., non-tall variables) or be represented as tall variables. Thin connection lines between blocks represent one or more variables that are all in the client workspace. Wide or bold connection lines represent one or more variables where at least one of the variables is a tall variable. A gather block indicates a gather operation that invokes an optimizer for all the tall variables converging to the gather block to optimize and combine data passes. Once datapasses are optimized, the backend distributes and triggers all required tall computations for the tall variables.

Figure 7A:
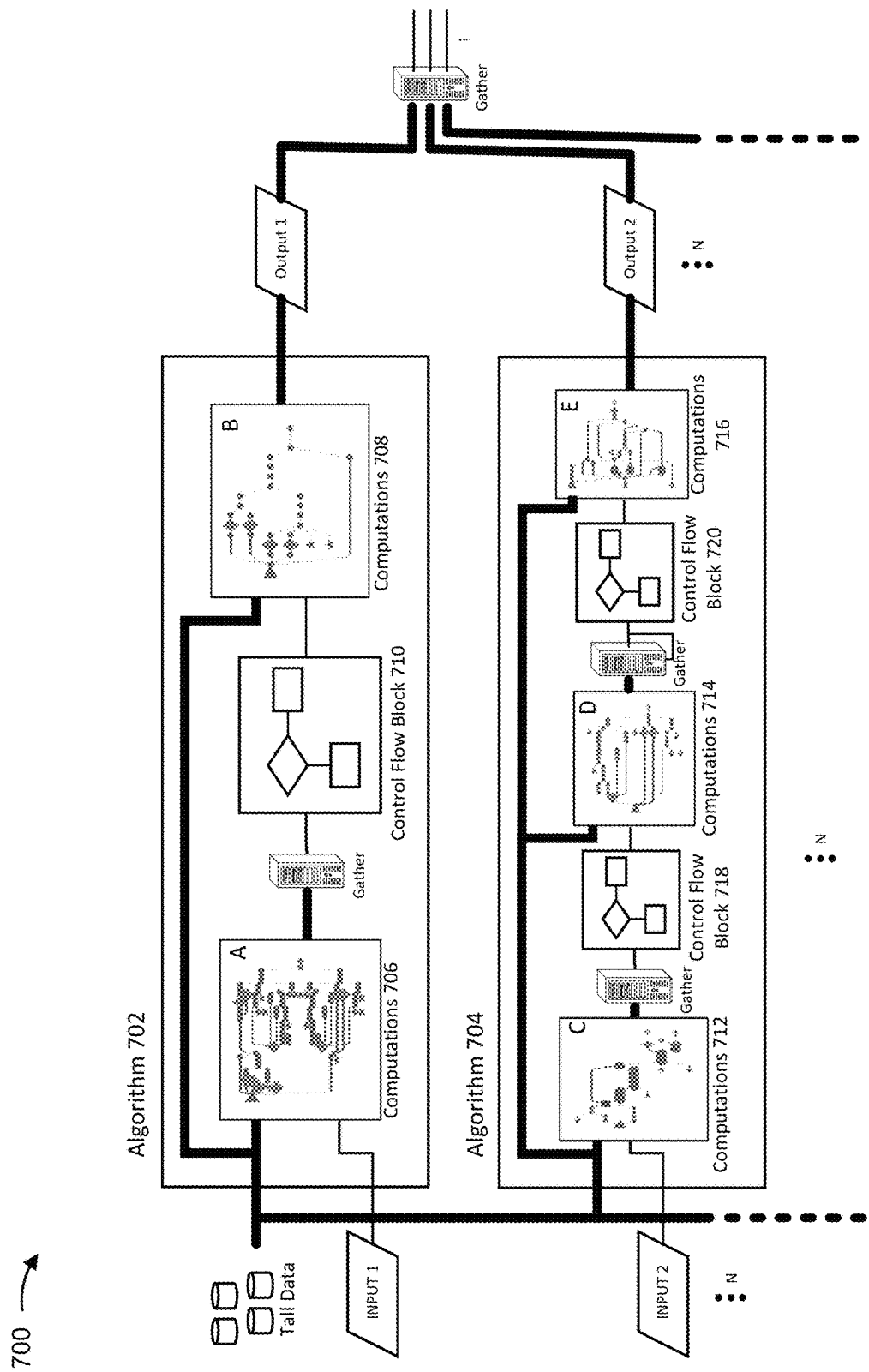
FIGS. 7A and 7B are diagrams of an example implementation for executing asymmetric algorithms.
Figure 7B:
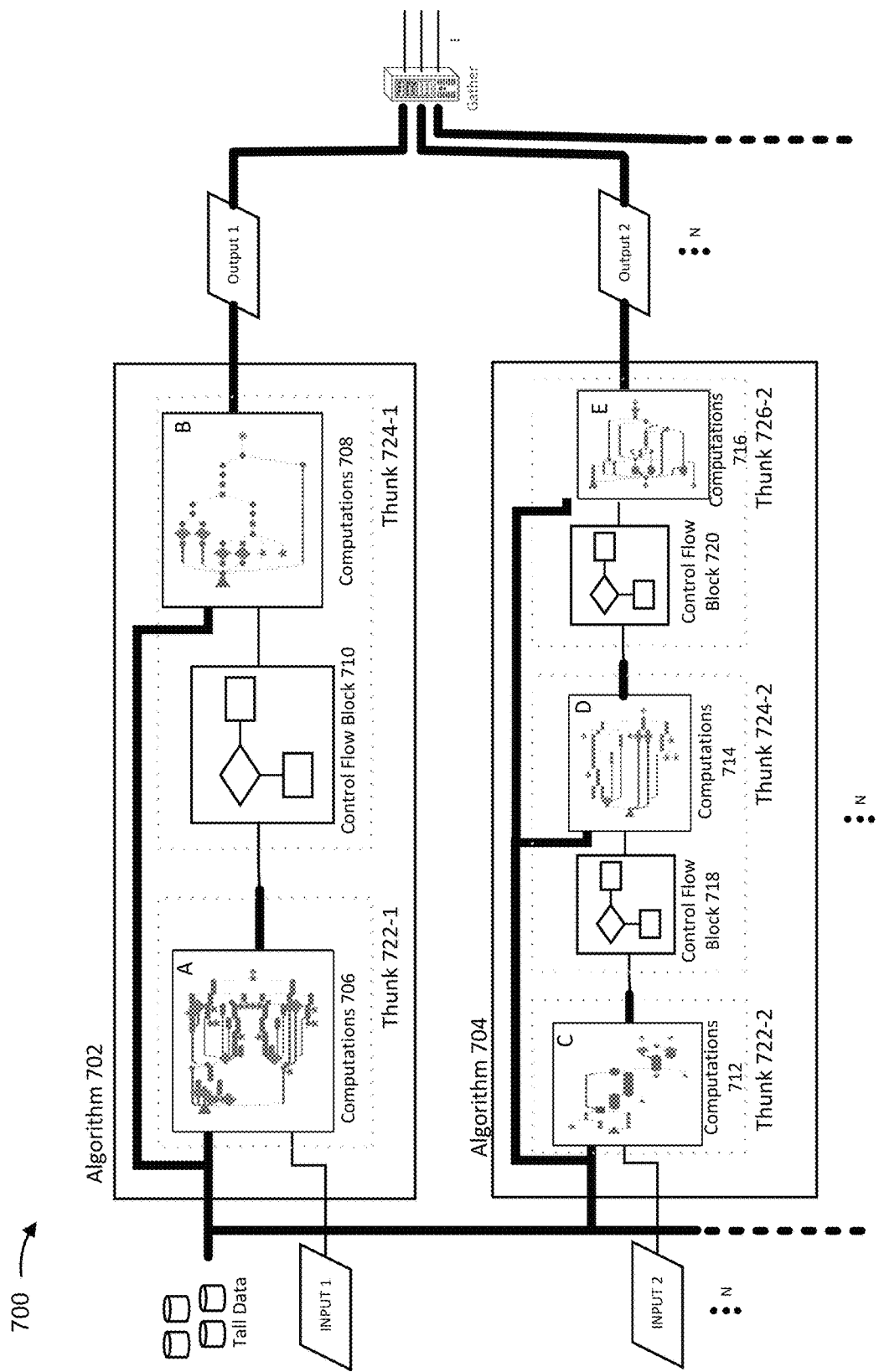

FIGS. 7A and 7B are diagrams of an example implementation 700 for executing asymmetric algorithms. For example, while FIGS. 1A and 1B provided an overview using symmetric algorithms (e.g., algorithms 102-1 to 102-N) as an example, the scheduler may also be used with asymmetric algorithms (e.g., algorithm 702 and algorithm 704 that include different computations and/or control flow statements).

In example implementation 700, assume algorithm 702 includes computations 706, computations 708, and control flow block 710. Control flow block 710 depends on an output of computations 706. Computations 708 require as input an output of control flow block 710. Further assume algorithm 704 includes computations 712-716, control flow block 718, and control flow block 720. Control flow block 718 depends on an output of computations 712, and computations 714 require as input an output of control flow block 718. Similarly, control flow block 720 depends on an output of computations 714, and computations 716 require as input an output of control flow block 720. Example implementation 700 can be extended up to N different asymmetric algorithms, each one implementing different algorithms that require a distinct number of data passes on the tall data. In example implementation 700, further assume that computations 706 use A data passes on the tall data, computations 708 use B data passes on the tall data, computations 712 use C data passes on the tall data, computations 714 use D data passes on the tall data, and computations 716 use E data passes on the tall data.

In FIG. 7A, client device 210 uses an explicit trigger of tall data computations for asymmetric algorithms. Client device 210 may invoke the explicit trigger by inserting gather blocks into algorithms 702 and 704 whenever a tall computation is required to compute a tall variable needed for input into a control flow block. For example, client device 210 may insert gather blocks after computations 706, 712, and 714 to trigger the tall computations. When using the explicit trigger of tall data computations and considering only algorithms 702 and 704, producing results will require A+C+D+max(B, E) data passes. In other words, only I/O operations for computations 708 and computations 716 may be combined because at this point there are no more control flow blocks remaining in algorithms 702 and 704, and all remaining I/O operations for algorithms 702 and 704 are known and combinable by the optimizer.

In FIG. 7B, client device 210 executes asymmetric algorithms with the support of the scheduler. For example, the scheduler defines thunks 722-1 to 726-2 that each are expressed in terms of a deferred tall computation as previously described. The scheduler pauses after execution of thunks 722-1 and 722-2 and then combines all the tall variables (e.g., outputs of thunks 722-1 and 722-2) from algorithms 702 and 704. The optimizer combines the data passes needed for computations 706 and 712 such that only max(A, C) data passes are required. The tall computations are triggered in the backend and the computed tall variables are pushed back to the context of each algorithm instance.

The scheduler then continues with scheduling and executing thunks 724-1 and 724-2. In algorithm 702, there are no more control flow blocks so the scheduler completes algorithm 702 and holds output 1 for future query (e.g., a future gather operation to be performed on the output of all algorithms). For algorithm 704, the scheduler pauses after thunk 724-2 and combines I/O operations to form D data passes needed for computations 714 (although these I/O operations are not combined with I/O operations for other algorithms assuming all other algorithms are completed). The tall computations are triggered in the backed and the computed tall variables are pushed back to the context of algorithm 704.

The scheduler then continues with scheduling and executing thunk 726-2. Because there are no more control flow blocks remaining in algorithm 704, the scheduler completes algorithm 704 and holds output 2 for future query. Once all algorithms are completed and all outputs have been held for further query, the optimizer may combine the I/O operations for the algorithms. When considering only algorithms 702 and 704, only max(B, E) data passes are required after the optimization. Thus, when using the scheduler and considering only algorithms 702 and 704, producing results will require max(A, C)+D+max(B, E) data passes.

Accordingly, fewer data passes of tall data are needed when using the scheduler to execute asymmetric algorithms, which include control flow statements, than are needed when gather operations are added into each algorithm to invoke an explicit trigger of tall computations. In this way, client device 210 and/or server device 230 improve performance by conserving computer resources required to execute algorithms 702 and 704, and reduce time required to perform operations on tall data.

As indicated above, FIGS. 7A and 7B are provided merely as an example. Other examples may differ from what was described with regard to FIGS. 7A and 7B.

Figure 8A:
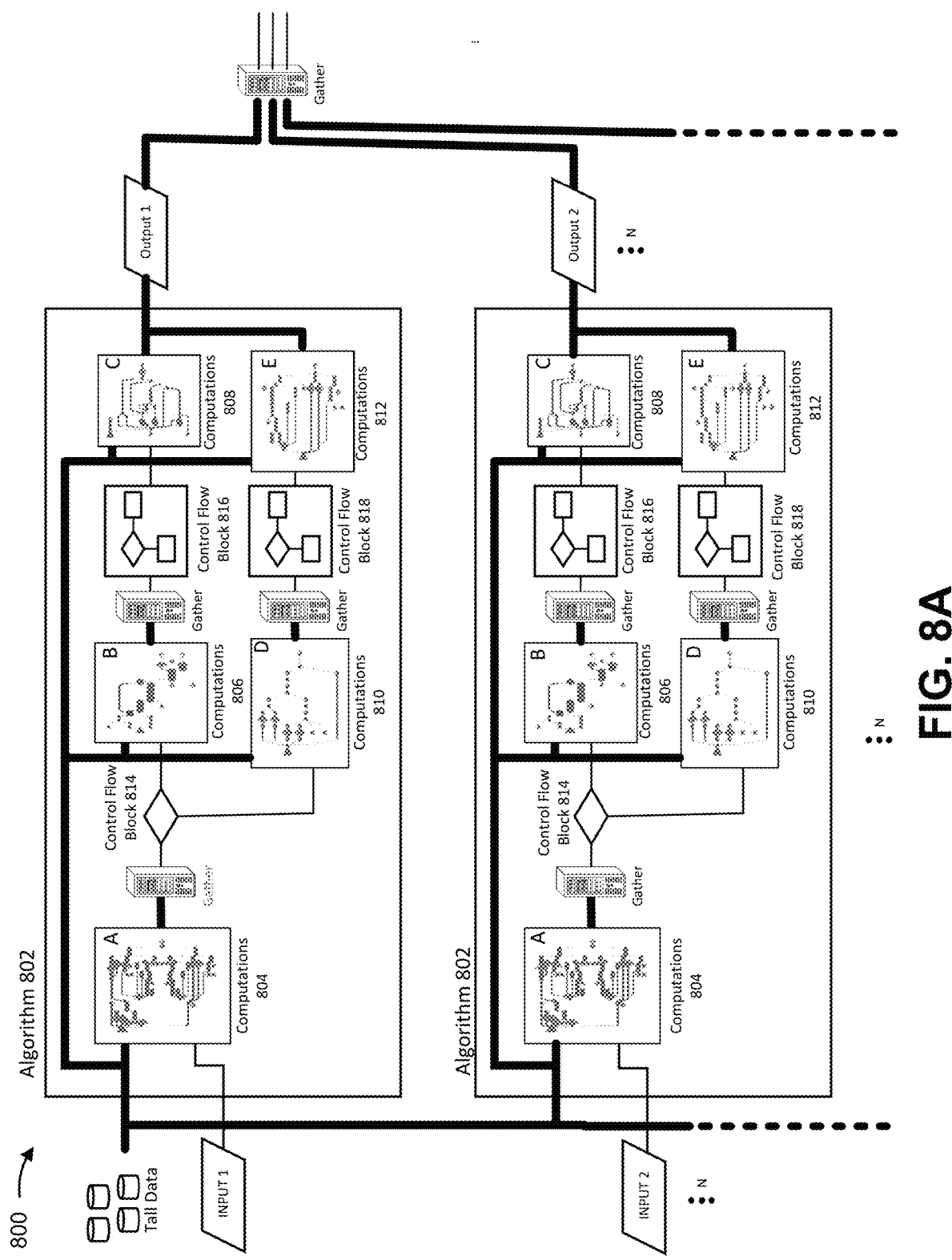
FIGS. 8A and 8B are diagrams of an example implementation for executing algorithms that include code branching which requires explicit trigger of tall computations.
Figure 8B:
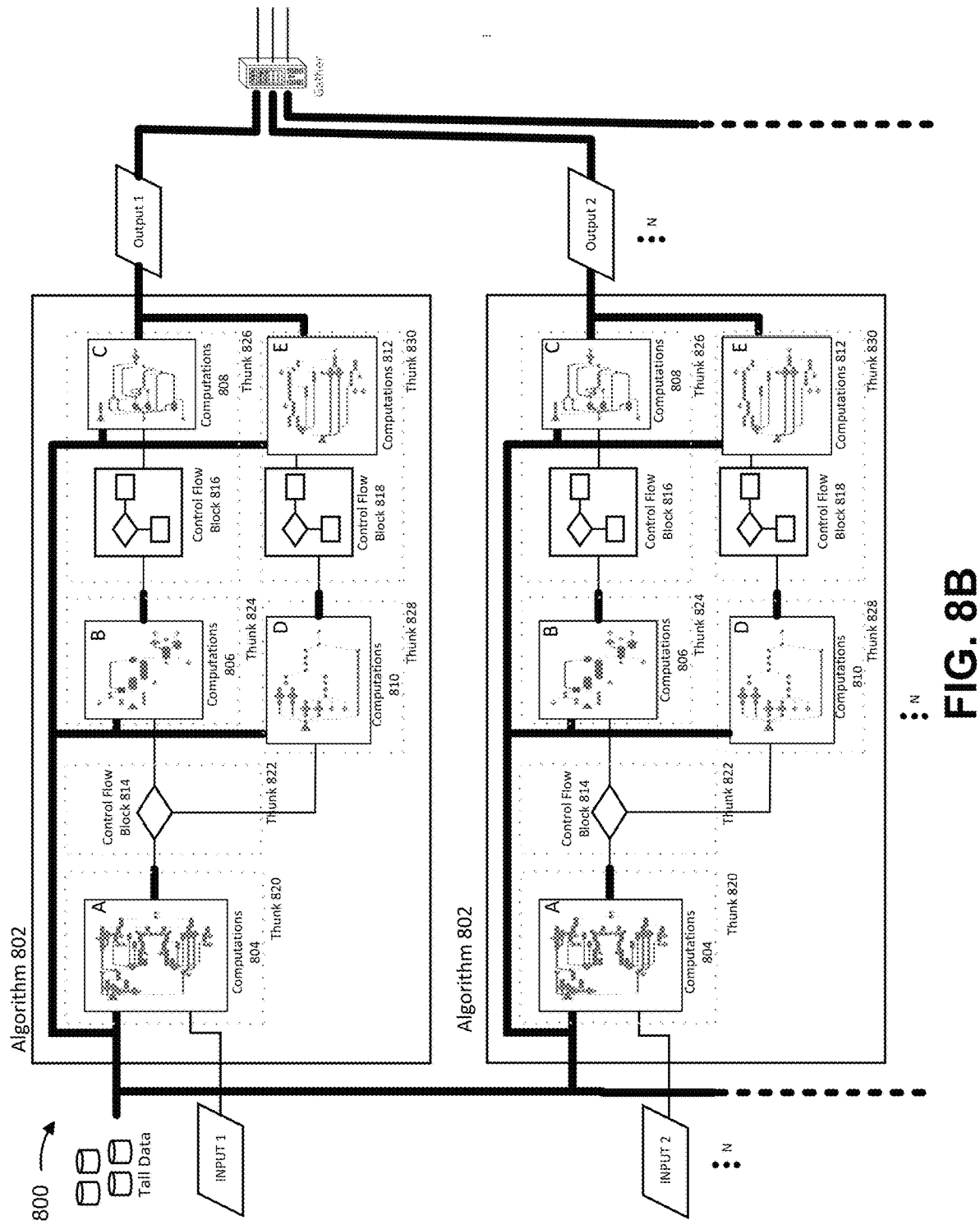

FIGS. 8A and 8B are diagrams of an example implementation 800 for executing algorithms that include code branching which requires explicit trigger of tall computations. In example implementation 800, assume algorithm 802 includes computations 804-812 and control flow blocks 814-818. Control flow block 814 depends on the output of computations 804. Control flow block 814 decides if computations 806 or computations 810 should be next, hence creating a branch. Computations 806 and 810 require as input the output of control flow block 814. Control flow blocks 816 and 818 depend on computations 806 and 810, respectively. Computations 808 and 812 depend on control flow blocks 816 and 818, respectively. Assume algorithm 802 is applied to N different sets of inputs (input 1, input 2, etc.) and all using the same tall data. Different inputs may lead to different results of control flow block 814, and therefore lead to different computations being used to produce the output due of algorithm 802 due to branching. In example implementation 800, further assume that computations 804 use A data passes on the tall data, computations 806 use B data passes on the tall data, computations 808 use C data passes on the tall data, computations 810 use D data passes on the tall data, and computations 812 use E data passes on the tall data.

In FIG. 8A, client device 210 uses an explicit trigger of tall data computations for algorithm 802. Client device 210 may invoke the explicit trigger by inserting gather blocks into algorithm 802 whenever a tall computation is required to compute a tall variable needed for input into a control flow block as shown. When using the explicit trigger of tall data computations and considering N algorithms 802, producing results will require (A+R)·N+Q data passes, where min (B, D)<R<max (B, D) and where min (C, E)<Q<max (C, E).

In FIG. 8B, client device 210 executes algorithm 802 using the scheduler described herein. For example, the scheduler may define thunks 820-830 as illustrated in FIG. 8B. When using the scheduler and considering N algorithms 802, producing results will require A+R+Q data passes, where min (B, D)<R<max (B, D) and where min (C, E)<Q<max (C, E).

Accordingly, fewer data passes of tall data are needed when using the scheduler to execute algorithms that include code branching, which require explicit trigger of tall computations, than are needed when gather operations are added into each algorithm to invoke an explicit trigger of tall computations. In this way, client device 210 and/or server device 230 improve performance by conserving computer resources required to execute algorithm 802 and reduce time required to perform operations on tall data.

As indicated above, FIGS. 8A and 8B are provided merely as an example. Other examples may differ from what was described with regard to FIGS. 8A and 8B.

Figure 9A:
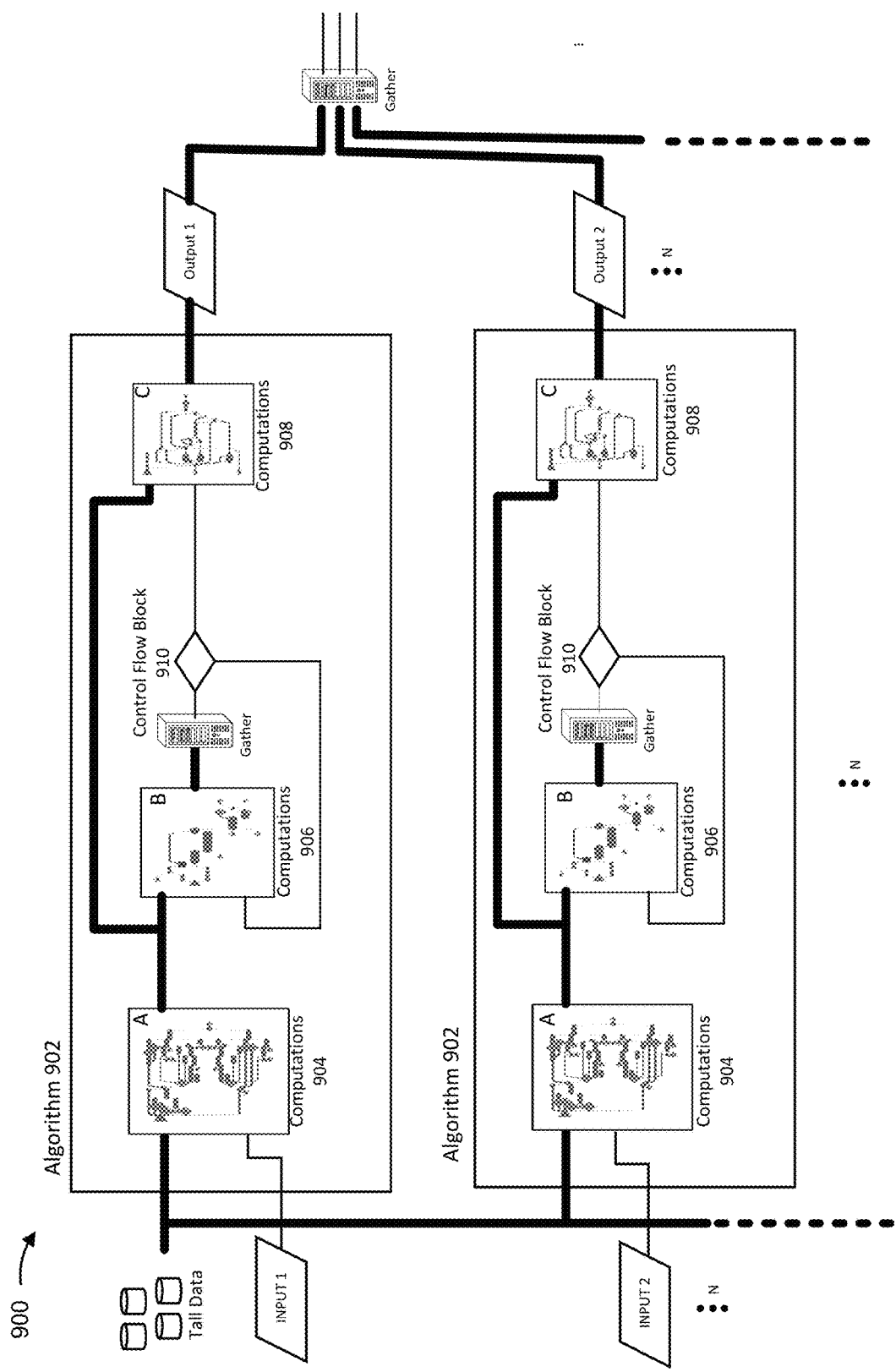
FIGS. 9A and 9B are diagrams of an example implementation for executing algorithms that include a body-loop, which requires explicit trigger of tall computations.
Figure 9B:
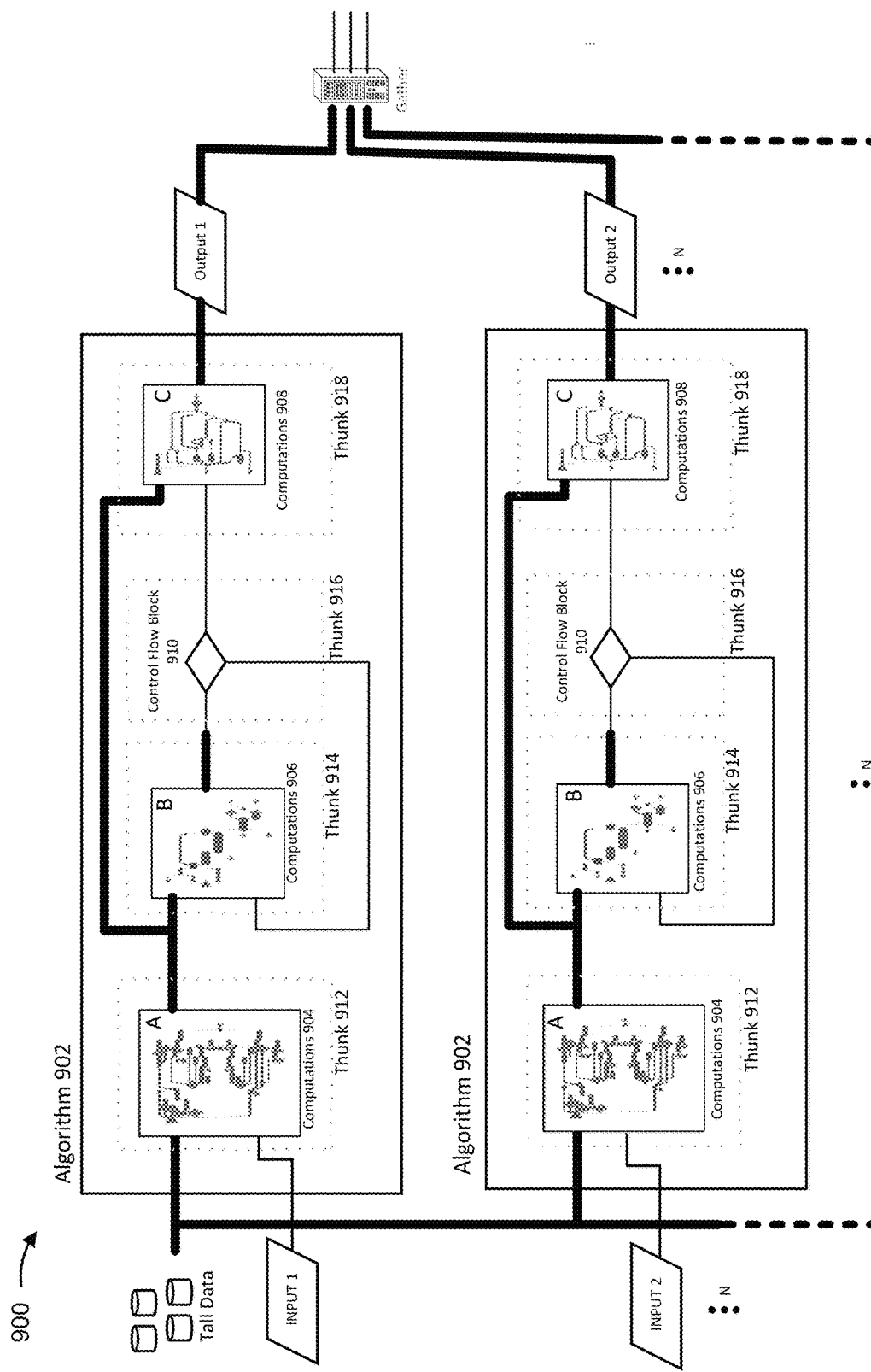

FIGS. 9A and 9B are diagrams of an example implementation 900 for executing algorithms that include a body-loop, which requires explicit trigger of tall computations.

In example implementation 900, assume algorithm 902 is includes computations 904-908 and control flow block 910. Control flow block 910 depends on the output of computations 906. Control flow block 910 decides if computations 906 or computations 908 should be next, hence creating a loop. Computations 906 and 910 require as input the output of control flow block 910. Assume algorithm 902 is applied to N different sets of inputs (input 1, input 2, etc.) and all using the same tall data. Different inputs may lead to different results of control flow block 910, and therefore lead to different numbers of iterations of the loop. In example implementation 900, further assume that computations 904 use A data passes on the tall data, computations 906 use B data passes on the tall data, and computations 908 use C data passes on the tall data.

In FIG. 9A, client device 210 uses an explicit trigger of tall data computations for algorithm 902. Client device 210 may invoke the explicit trigger by inserting gather blocks into algorithm 902 whenever a tall computation is required compute a tall variable needed for input into a control flow block as shown (e.g., before control flow block 910). When using the explicit trigger of tall data computations and assuming all instances of algorithm 902 require M iterations, producing results for all N algorithms 902 will require (R+B·(M−1))·N+C data passes, where max (A, B)<R<A+B.

In FIG. 9B, client device 210 executes algorithm 902 using the scheduler described herein. For example, the scheduler may define thunks 912-918 as illustrated in FIG. 9B. When using the scheduler and assuming all instances of algorithm 902 require M iterations, producing results for all N algorithms 902 will require R+B·(M−1)+C data passes, where max (A, B)<R<A+B.

Accordingly, fewer data passes of tall data are needed when using the scheduler to execute algorithms that include a body-loop, which requires explicit trigger of tall computations, than are needed when gather operations are added into each algorithm to invoke an explicit trigger of tall computations. In this way, client device 210 and/or server device 230 improve performance by conserving computer resources required to execute algorithm 902 and reduce time required to perform operations on tall data.

As indicated above, FIGS. 9A and 9B are provided merely as an example. Other examples may differ from what was described with regard to FIGS. 9A and 9B.

Figure 10A:
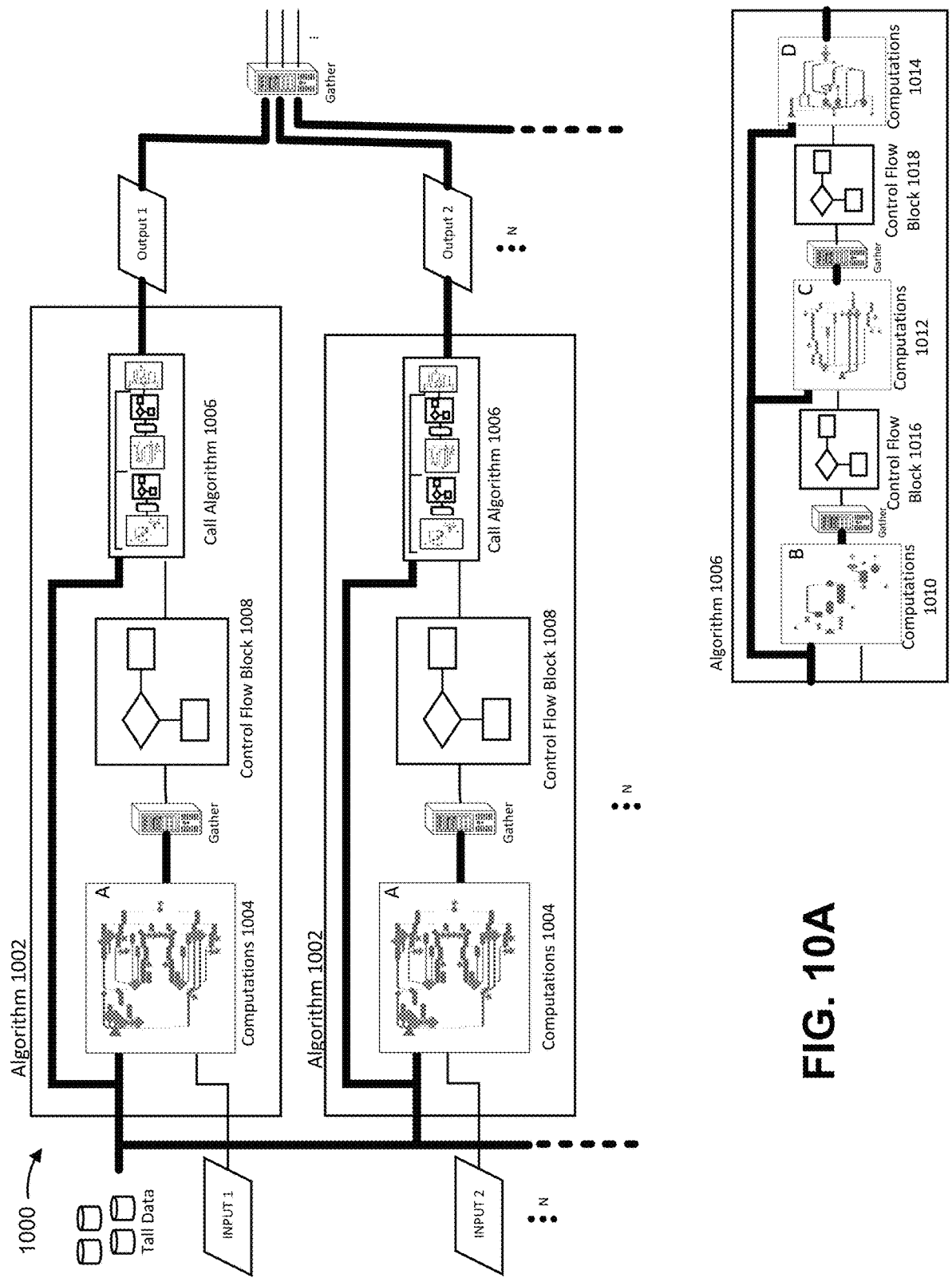
FIGS. 10A and 10B are diagrams of an example implementation for executing algorithms that call other algorithms, which requires explicit trigger of tall computations.
Figure 10B:
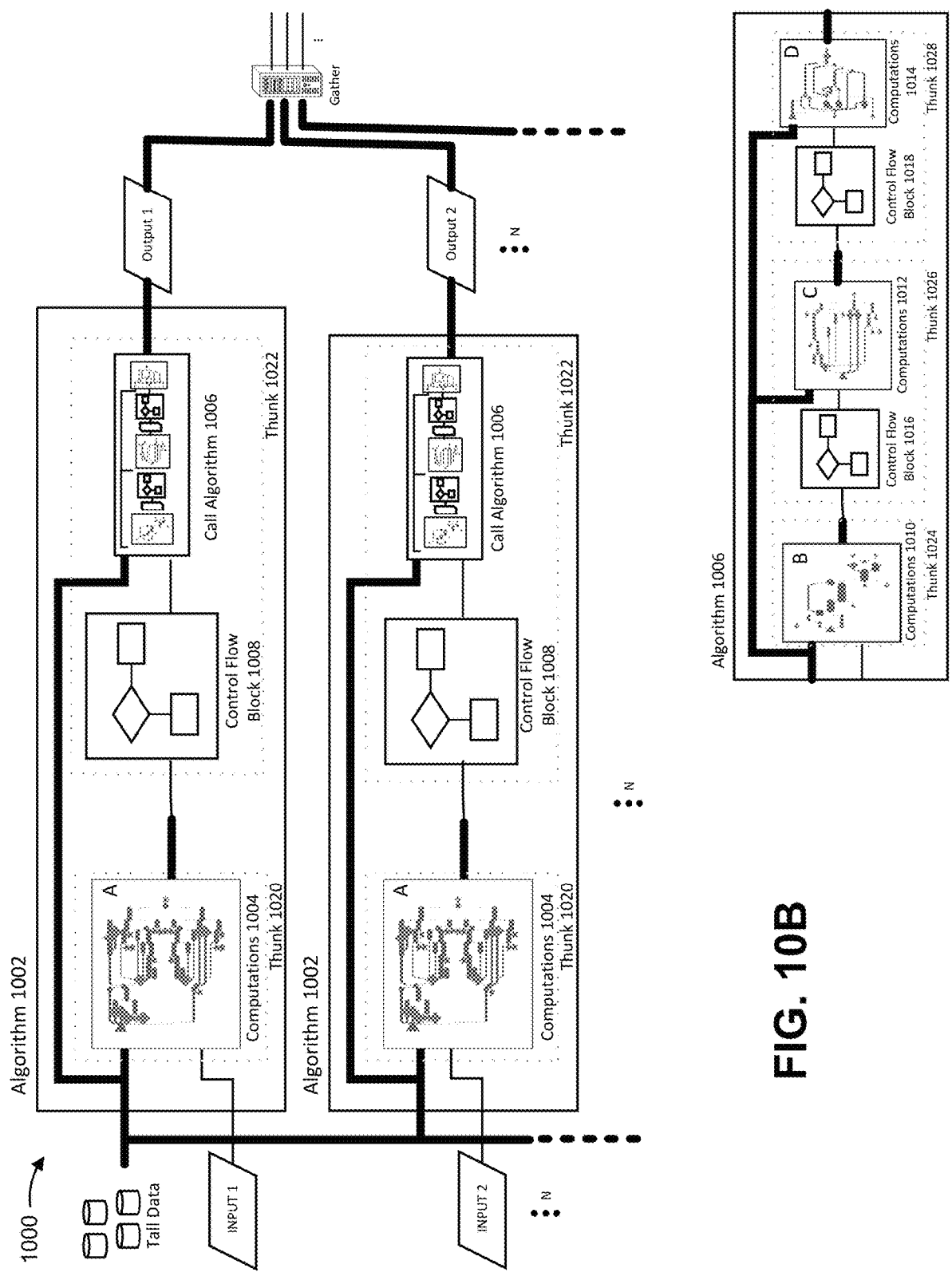

FIGS. 10A and 10B are diagrams of an example implementation 1000 for executing algorithms that call other algorithms, which requires explicit trigger of tall computations.

In example implementation 1000, assume algorithm 1002 includes computations 1004, a call to algorithm 1006, and control flow block 1008. Control flow block 1008 depends on the output of computations 1004. Calling algorithm 1006 may require as an input the output of control flow block 1008. Algorithm 1006 triggers tall computations and includes computations 1010-1014 and control flow blocks 1016 and 1018. Control flow blocks 1016 and 1018 may depend on computations 1010 and 1012, respectively. Computations 1012 and 1014 may require as input the output of control flow blocks 1016 and 1018, respectively. Assume algorithm 1002 is applied to N different sets of inputs (input 1, input 2, etc.) and all using the same tall data. In example implementation 1000, further assume that computations 1004 use A data passes on the tall data, computations 1010 use B data passes on the tall data, computations 1012 use C data passes on the tall data, and computations 1014 use D data passes on the tall data.

In FIG. 10A, client device 210 uses an explicit trigger of tall data computations for algorithm 1002. Client device 210 may invoke the explicit trigger by inserting gather blocks into algorithm 1002 whenever a tall computation is required compute a tall variable needed for input into a control flow block as shown (e.g., before control flow blocks 1008, 1016, and 1018). When using the explicit trigger of tall data computations, producing results for all N algorithms 1002 will require (A+B+C)·N+D data passes.

In FIG. 10B, client device 210 executes algorithm 1002 using the scheduler described herein. For example, the scheduler may define thunks 1020-1028 as illustrated in FIG. 10B. When using the scheduler, producing results for all N algorithms 1002 will require A+B+C+D data passes.

Accordingly, fewer data passes of tall data are needed when using the scheduler to execute algorithms that call another algorithm, which requires explicit trigger of tall computations, than are needed when gather operations are added into each algorithm to invoke an explicit trigger of tall computations. In this way, client device 210 and/or server device 230 improve performance by conserving computer resources required to execute algorithm 1002 and reduce time required to perform operations on tall data.

As indicated above, FIGS. 10A and 10B are provided merely as an example. Other examples may differ from what was described with regard to FIGS. 10A and 10B.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, and/or a combination of hardware and software.

Program code (sometimes referred to herein as code) is to be broadly interpreted to include text-based code that may not require further processing to execute (e.g., C++ code, Hardware Description Language (HDL) code, very-high-speed integrated circuits (VHSIC) HDL (VHDL) code, Verilog code, Java code, another type of hardware and/or software based code that may be compiled and/or synthesized, etc.), binary code that may be executed (e.g., executable files that may be directly executed by an operating system, bitstream files that may be used to configure an FPGA, Java byte code, object files combined together with linker directives, source code, makefiles, etc.), text files that may be executed in conjunction with other executables (e.g., Python text files, Octave files, a collection of dynamic-link library (DLL) files with text-based combining, configuration information that connects pre-compiled modules, an extensible markup language (XML) file describing module linkage, etc.), source code (e.g., readable by a human), machine code (e.g., readable by a machine), or the like. In some implementations, program code may include different combinations of the above-identified classes of code (e.g., text-based code, binary code, text files, source code, machine code, etc.). Additionally, or alternatively, program code may include code generated using a dynamically-typed programming language (e.g., the M language, a MATLAB® language, a MATLAB-compatible language, a MATLAB-like language, etc.) that may be used to express problems and/or solutions using mathematical notations. Additionally, or alternatively, program code may be of any type, such as a function, a script, an object, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
generating, by one or more processors, a data structure for a plurality of algorithms that operate concurrently on tall data,
each of the plurality of algorithms including computations that include at least one tall variable associated with the tall data, and a control flow statement associated with a tall computation for the tall variable,
the data structure defining subroutines, for each respective algorithm of the plurality of algorithms, that have an output expressed in terms of a deferred tall computation for the at least one tall variable, and
the subroutines being defined based on the computations and the control flow statement;
executing, by the one or more processors, a first subroutine of each algorithm without triggering the tall computation until the first subroutine of each algorithm is completed executing;
performing, by the one or more processors and based on the output expressed in terms of the deferred tall computation, the tall computation for the first subroutine of each algorithm based on combining data passes on the tall data needed to perform the tall computation for the first subroutine of each algorithm; and
for each respective algorithm of the plurality of algorithms, scheduling operations of a second subroutine to execute based on the tall computation for the respective algorithm and the control flow statement included in the respective algorithm,
the scheduling being performed by the one or more processors,
where the first subroutine and the second subroutine are defined based on an input of a first control flow statement being dependent on first computations that include a first tall variable,
the first subroutine being defined to include the first computations that include the first tall variable,
the second subroutine being defined to include the first control flow statement, and
execution of the first subroutine and the second subroutine being separated by a deferred computation of the first tall variable.

2. The method of claim 1, where a branch of computations resulting from the control flow statement is selected based on the tall computation,
the operations of the second subroutine being scheduled based on the branch of computations that is selected.

3. The method of claim 1, further comprising:
pausing execution of the plurality of algorithms based on completing execution of the first subroutine of each algorithm,
the data passes on the tall data being combined while the plurality of algorithms are paused.

4. The method of claim 3, further comprising:
restarting execution of the plurality of algorithms after performing the tall computation for the first subroutine of each algorithm.

5. The method of claim 1, further comprising:
determining whether an algorithm of the plurality of algorithms is completed,
the operations of the second subroutine being scheduled based on whether the algorithm is completed.

6. The method of claim 5, where the algorithm is determined not to be completed when a function handle is returned as a result by a most recently executed subroutine of the algorithm, and
where the algorithm is determined to be completed when a function handle is not returned as the result by the most recently executed subroutine of the algorithm.

7. The method of claim 1, where scheduling operations of the second subroutine includes:
determining the second subroutine based on the data structure and a function handle returned as a result of performing the tall computation for the first subroutine.

8. The method of claim 1, where the subroutines are thunks that inject an additional calculation into another subroutine.

9. A non-transitory computer-readable medium storing instructions, the instructions comprising:
one or more instructions that, when executed by one or more processors, cause the one or more processors to:
generate a data structure for a plurality of algorithms that operate concurrently on tall data,
each of the plurality of algorithms including computations that include at least one tall variable associated with the tall data, and a control flow statement associated with a tall computation for the tall variable,
the data structure defining subroutines, for each respective algorithm of the plurality of algorithms, that have an output expressed in terms of a deferred tall computation for the at least one tall variable, and
the subroutines being defined based on the computations and the control flow statement;
execute a first subroutine of each algorithm without triggering the tall computation until the first subroutine of each algorithm is completed executing;
perform, based on the output expressed in terms of the deferred tall computation, the tall computation for the first subroutine of each algorithm based on combining data passes on the tall data needed to perform the tall computation for the first subroutine of each algorithm; and for each respective algorithm of the plurality of algorithms, schedule operations of a second subroutine to execute based on the tall computation for the respective algorithm and the control flow statement included in the respective algorithm, where the first subroutine and the second subroutine are defined based on an input of a first control flow statement being dependent on first computations that include a first tall variable, the first subroutine being defined to include the first computations that include the first tall variable, the second subroutine being defined to include the first control flow statement, and execution of the first subroutine and the second subroutine being separated by a deferred computation of the first tall variable.

10. The non-transitory computer-readable medium of claim 9, where a branch of computations resulting from the control flow statement is selected based on the tall computation, the operations of the second subroutine being scheduled based on the branch of computations that is selected.

11. The non-transitory computer-readable medium of claim 9, where the one or more instructions, when executed by the one or more processors, further cause the one or more processors to:

pause execution of the plurality of algorithms based on completing execution of the first subroutine of each algorithm, the data passes on the tall data being combined while the plurality of algorithms are paused.

12. The non-transitory computer-readable medium of claim 11, where the one or more instructions, when executed by the one or more processors, further cause the one or more processors to:

restart execution of the plurality of algorithms after performing the tall computation for the first subroutine of each algorithm.

13. The non-transitory computer-readable medium of claim 9, where the one or more instructions, when executed by the one or more processors, further cause the one or more processors to:

determine whether an algorithm of the plurality of algorithms is completed, the operations of the second subroutine being scheduled based on whether the algorithm is completed.

14. The non-transitory computer-readable medium of claim 13, where the algorithm is determined not to be completed when a function handle is returned as a result by a most recently executed subroutine of the algorithm, and where the algorithm is determined to be completed when a function handle is not returned as the result by the most recently executed subroutine of the algorithm.

15. The non-transitory computer-readable medium of claim 9, where the one or more instructions, that cause the one or more processors to schedule operations of the second subroutine, further cause the one or more processors to:

determine the second subroutine based on the data structure and a function handle returned as a result of performing the tall computation for the first subroutine.

16. The non-transitory computer-readable medium of claim 9, where the subroutines are thunks that inject an additional calculation into another subroutine.

17. A device, comprising:

one or more memories; and one or more processors, communicatively coupled to the one or more memories, to:

generate a data structure for a plurality of algorithms that operate concurrently on tall data, each of the plurality of algorithms including computations that include at least one tall variable associated with the tall data, and a control flow statement associated with a tall computation for the tall variable, the data structure defining subroutines, for each respective algorithm of the plurality of algorithms, that have an output expressed in terms of a deferred tall computation for the at least one tall variable, and the subroutines being defined based on the computations and the control flow statement;

execute a first subroutine of each algorithm without triggering the tall computation until the first subroutine of each algorithm is completed executing;

perform, based on the output expressed in terms of the deferred tall computation, the tall computation for the first subroutine of each algorithm based on combining data passes on the tall data needed to perform the tall computation for the first subroutine of each algorithm; and for each respective algorithm of the plurality of algorithms, schedule operations of a second subroutine to execute based on the tall computation for the respective algorithm and the control flow statement included in the respective algorithm, where the first subroutine and the second subroutine are defined based on an input of a first control flow statement being dependent on first computations that include a first tall variable, the first subroutine being defined to include the first computations that include the first tall variable, the second subroutine being defined to include the first control flow statement, and execution of the first subroutine and the second subroutine being separated by a deferred computation of the first tall variable.

18. The device of claim 17, where the subroutines are thunks that inject an additional calculation into another subroutine.

* * * * *